United States Patent
Lee et al.

(10) Patent No.: US 10,416,788 B2
(45) Date of Patent: Sep. 17, 2019

(54) DEVICE CONTROLLER AND DATA PROCESSING METHOD THEREOF

(71) Applicant: LG ELECTRONICS INC., Seoul (KR)

(72) Inventors: Kunwoo Lee, Seoul (KR); Dongik Kim, Seoul (KR); Junseok Bang, Seoul (KR); Hyunjin Yoon, Seoul (KR); Seungil Lee, Seoul (KR); Sunho Cho, Seoul (KR); Chulbae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/819,321

(22) Filed: Nov. 21, 2017

(65) Prior Publication Data

US 2018/0143702 A1 May 24, 2018

(30) Foreign Application Priority Data

Nov. 21, 2016 (KR) .................. 10-2016-0155032

(51) Int. Cl.
*G06F 3/0346* (2013.01)
*G06F 3/0487* (2013.01)
(Continued)

(52) U.S. Cl.
CPC .......... *G06F 3/0346* (2013.01); *G05B 15/02* (2013.01); *G06F 3/016* (2013.01); *G06F 3/017* (2013.01);
(Continued)

(58) Field of Classification Search
CPC ........ G06F 3/0346; G06F 3/016; G06F 3/017; G06F 3/0487
See application file for complete search history.

(56) References Cited

U.S. PATENT DOCUMENTS

2002/0113775 A1   8/2002  Spencer
2005/0275621 A1  12/2005  Saez et al.
(Continued)

FOREIGN PATENT DOCUMENTS

WO    WO 2011/146668    11/2011

OTHER PUBLICATIONS

Fabian Hemmed, "Shape-Changing Mobiles:Tapering in Two-Dimensional Deformational Displays in Mobile Phones". Proceeding CHI 2010, Extended Abstracts on Human Factors in Computing Systems, pp. 3075-3080. (Year: 2010).*

(Continued)

*Primary Examiner* — Thomas C Lee
*Assistant Examiner* — Charles Cai
(74) *Attorney, Agent, or Firm* — KED & Associates, LLP

(57) ABSTRACT

A device controller and data processing method thereof are disclosed. According to the present invention, the device controller for controlling a digital device includes a cover, an upper core part including an input unit, a lower core part including an interface unit, and a core including a core body combined with the upper core part and the lower core part. The core body includes a communication module configured to transmit and receive control signals for controlling the digital device, a first sensor module configured to sense motion data according to a movement of the device controller, a second sensor module configured to sense pressure applied to the core body, a control unit configured to control operations of the modules, collect data sensed by the sensor modules, generate a control signal based on the collected sensed data, and output feedback.

9 Claims, 29 Drawing Sheets

(51) Int. Cl.
*G06F 3/0485* (2013.01)
*G05B 15/02* (2006.01)
*G06F 3/01* (2006.01)

(52) U.S. Cl.
CPC .......... *G06F 3/0485* (2013.01); *G06F 3/0487* (2013.01); *G06F 2203/04806* (2013.01)

(56) References Cited

U.S. PATENT DOCUMENTS

| | | | |
|---|---|---|---|
| 2007/0290993 A1* | 12/2007 | Baudisch | G06F 3/0317 345/157 |
| 2010/0245232 A1* | 9/2010 | Birnbaum | A63F 13/06 345/156 |
| 2010/0245239 A1 | 9/2010 | Sternberg | |
| 2010/0261530 A1* | 10/2010 | Thomas | A63F 13/42 463/36 |
| 2015/0054633 A1* | 2/2015 | Saddik | G06F 3/016 340/407.1 |
| 2015/0097774 A1* | 4/2015 | Kabasawa | G06F 3/016 345/158 |
| 2016/0011660 A1 | 1/2016 | Wieder | |
| 2016/0277699 A1* | 9/2016 | Cho | H04N 21/42222 |

OTHER PUBLICATIONS

International Search Report and Written Opinion dated Mar. 15, 2018 issued in Application No. PCT/KR2017/013007 (Full English Text).

\* cited by examiner

FIG. 4
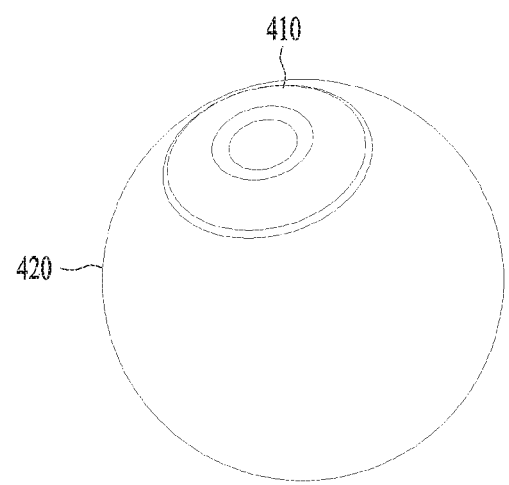
(a)
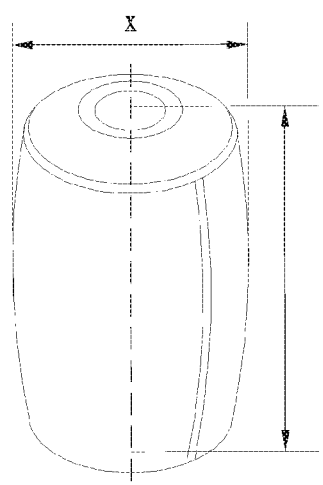
(b)

FIG. 6
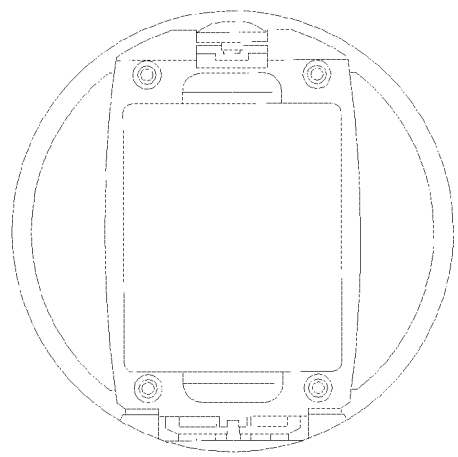
(a)
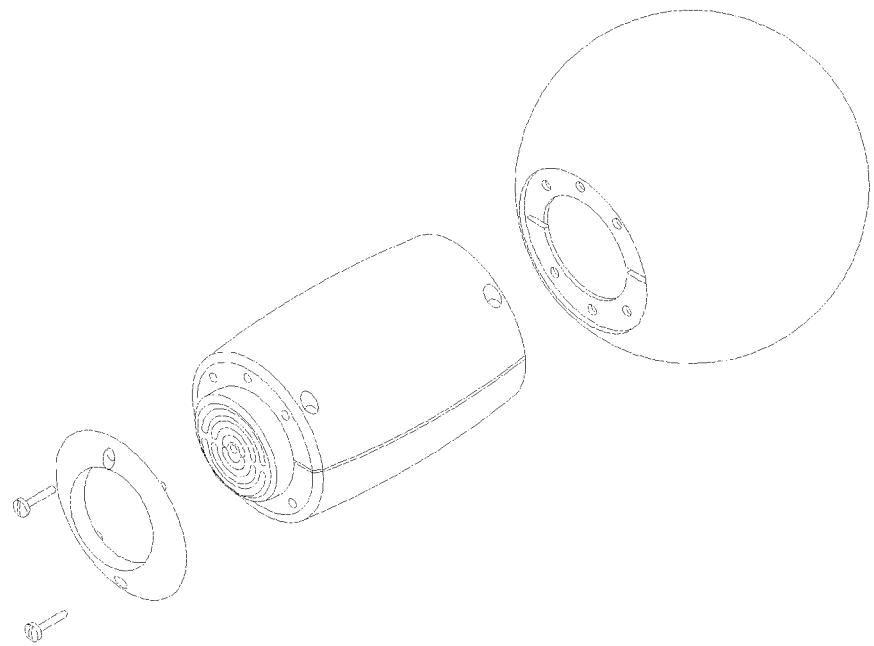
(b)

FIG. 7
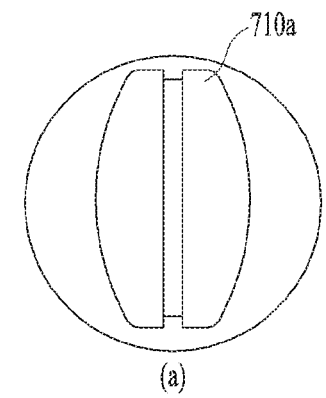
(a)
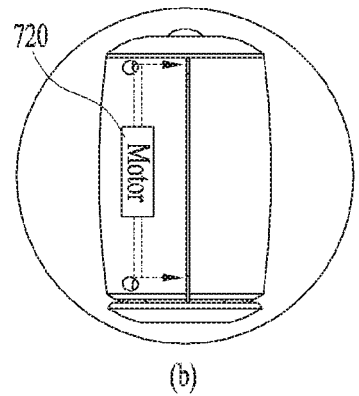
(b)
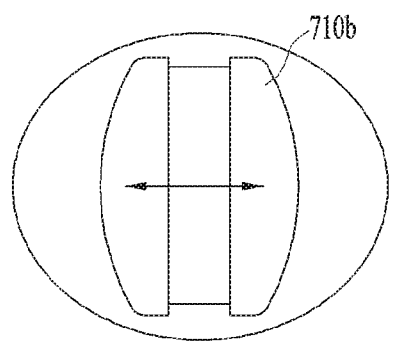
(c)
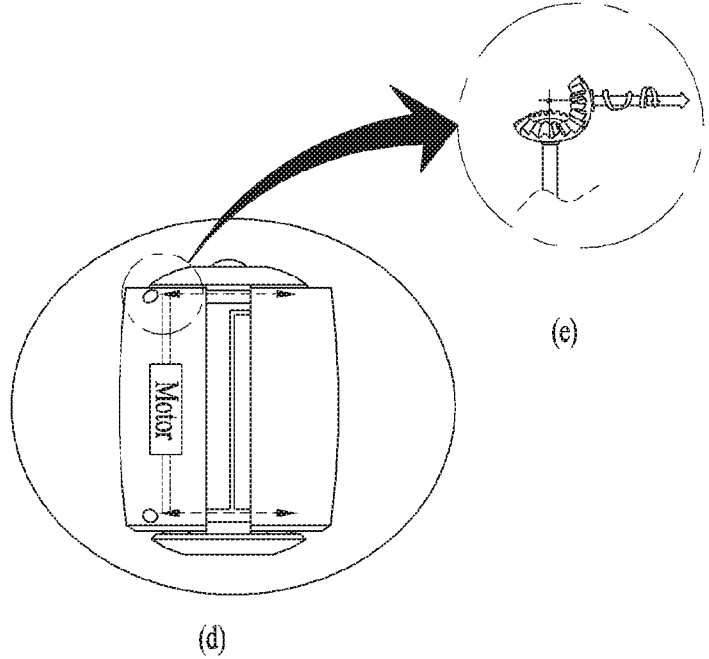
(d)
(e)

(a)   (b)

FIG. 9
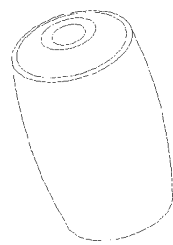
(a)
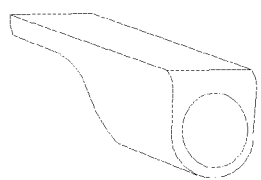
(b)
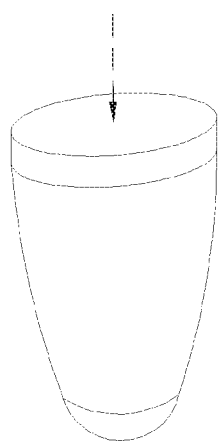
(e)
(a)
(d)

FIG. 10
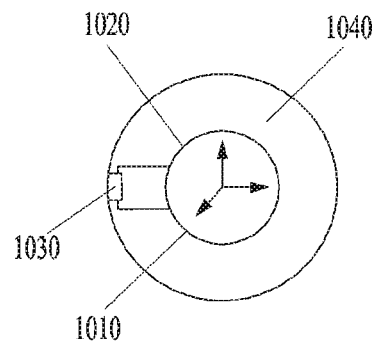
(a)
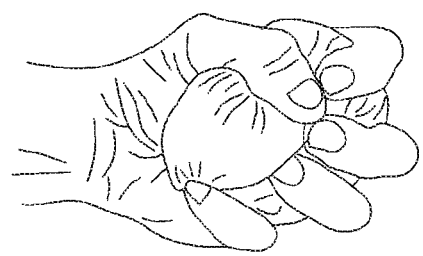
(b)
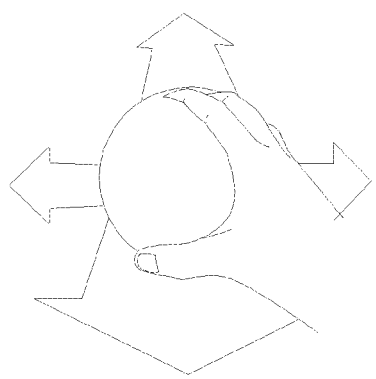
(c)
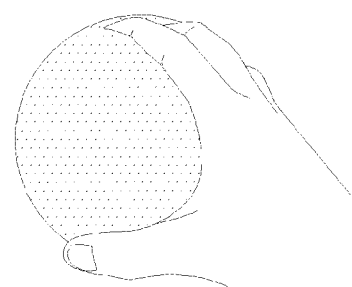
(d)
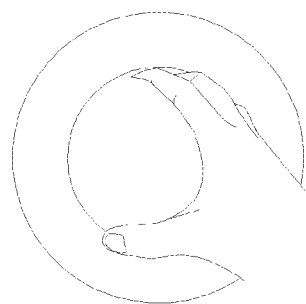
(e)

FIG. 12
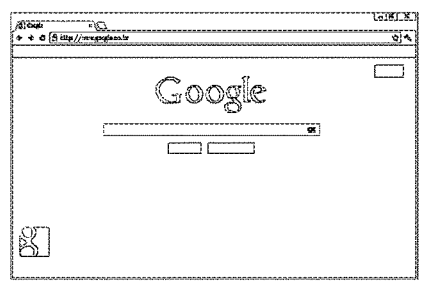
(a)
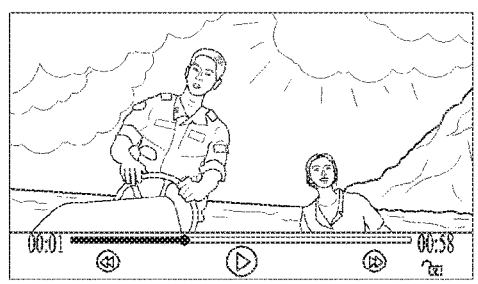
(b)
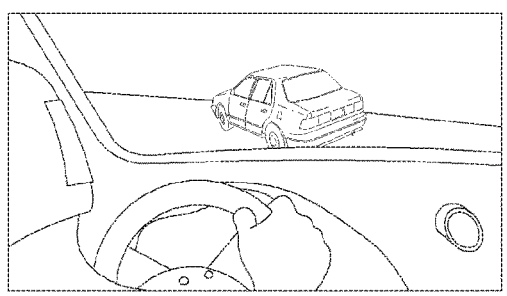
(c)
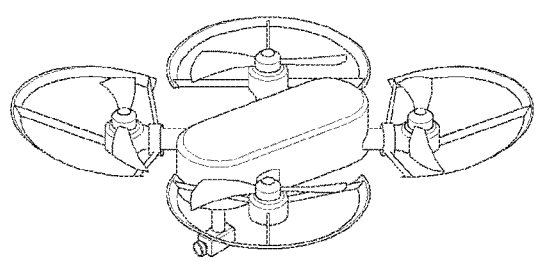
(d)
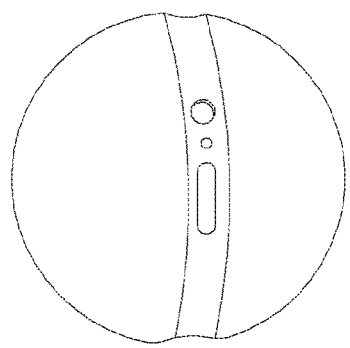
(e)
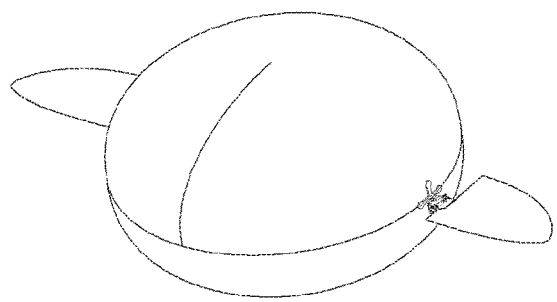
(f)

FIG. 13
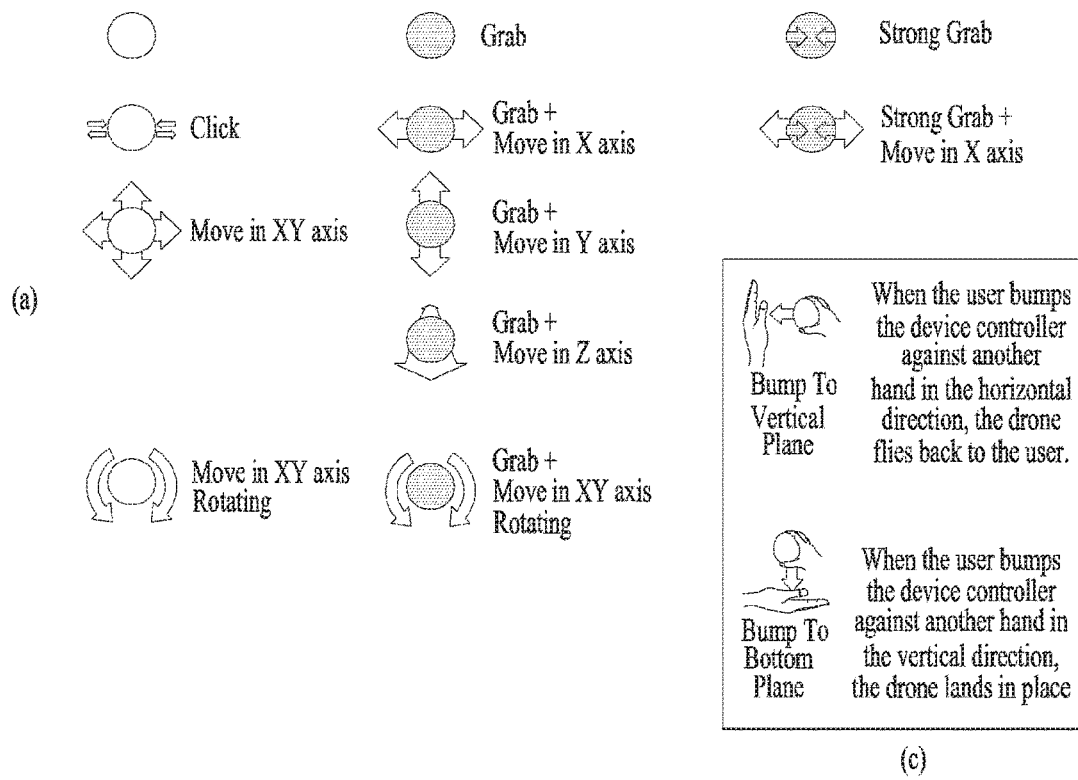
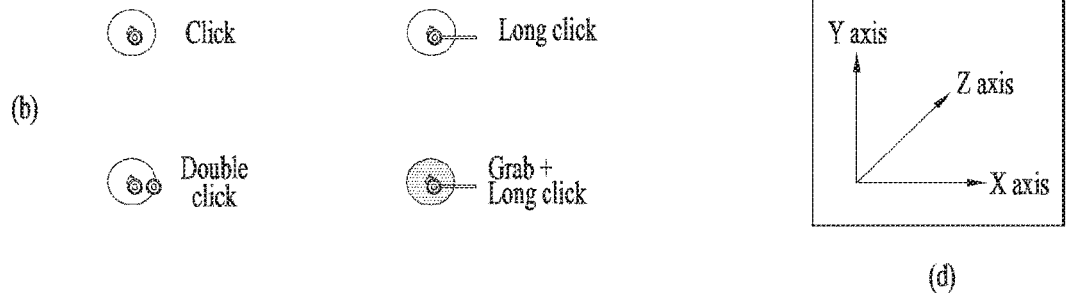

FIG. 14
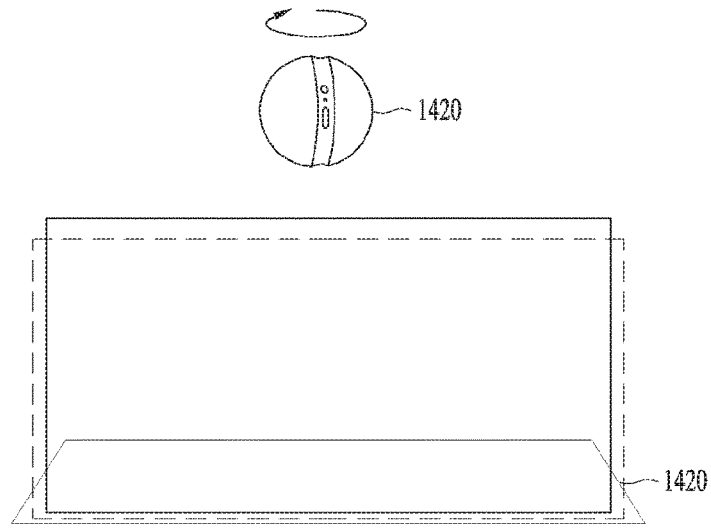
(a)
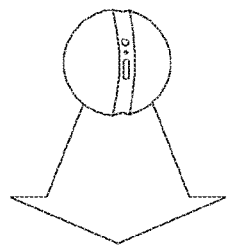
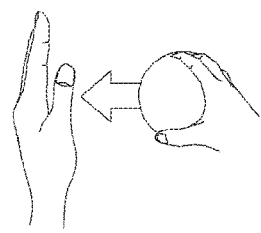
(b)

FIG. 17
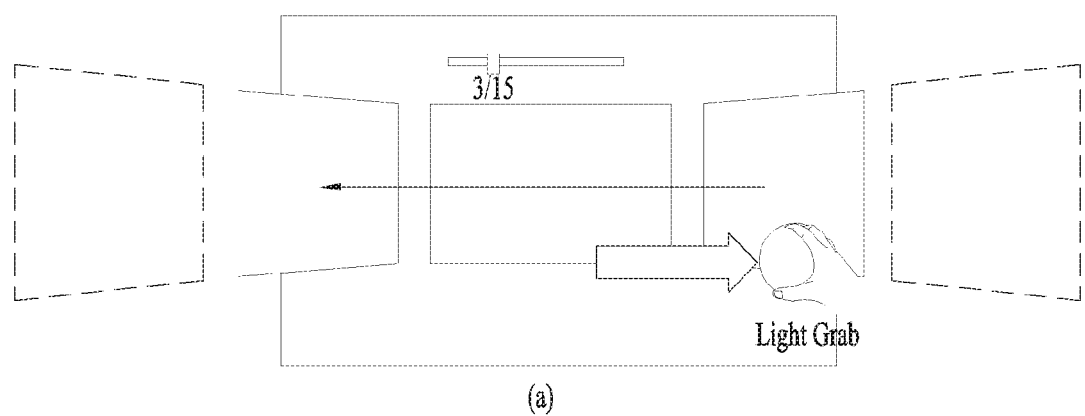
(a)
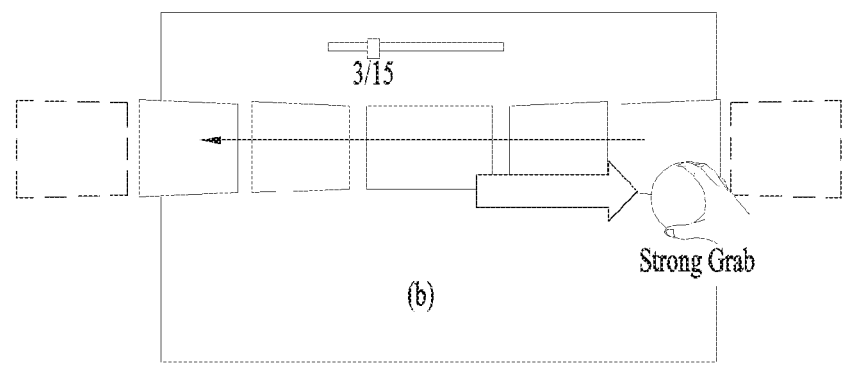
(b)

(a)　　　　　　　　　　　(b)

FIG. 26
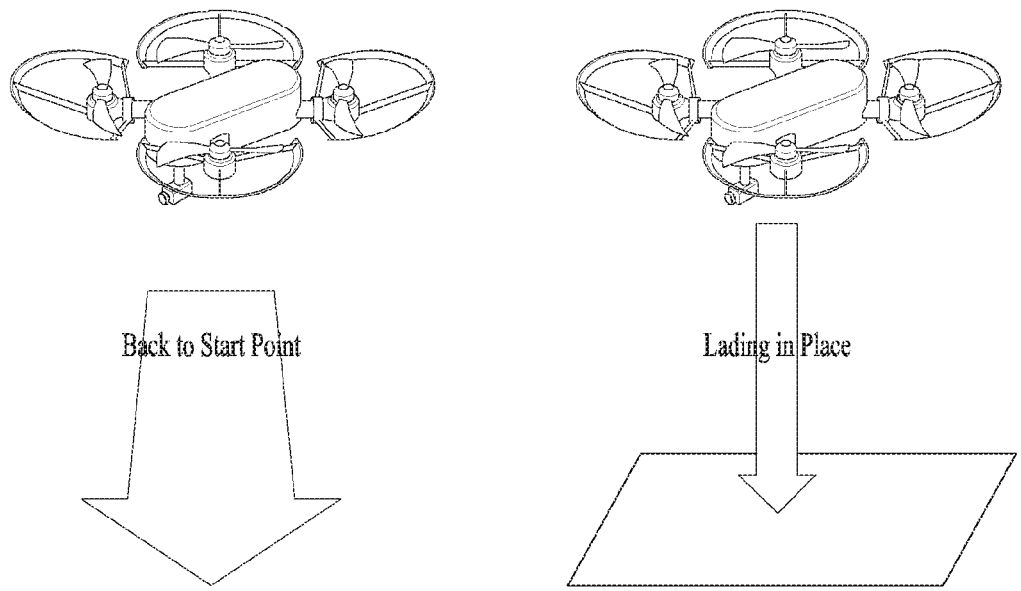
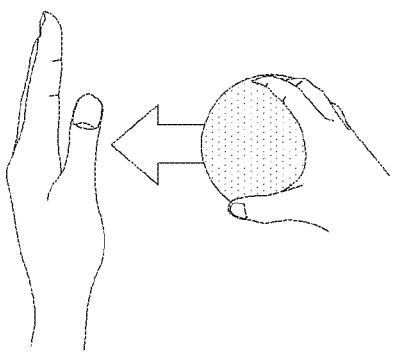
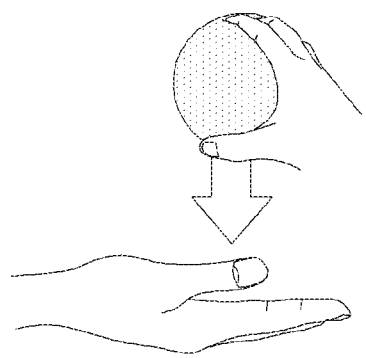
Long Squeeze
& Bump To Vertical Plane
(a)
Long Squeeze
& Bump To Bottom Plane
(b)

DEVICE CONTROLLER AND DATA PROCESSING METHOD THEREOF

Pursuant to 35 U.S.C. § 119(a), this application claims priority to Korean Patent Application No. 10-2016-0155032 filed on Nov. 21, 2016 in Korea, the entire contents of which is hereby incorporated by reference in its entirety.

BACKGROUND OF THE INVENTION

Field of the Invention

The present invention relates to a device controller, and more particularly, to a device controller and method of controlling a digital device using the same.

Discussion of the Related Art

In the related art, digital devices have been controlled using controllers. For example, a personal computer (PC) has been controlled by a keyboard or a mouse and a television (TV) has been controlled by a remote controller. Recently, with the advent of digital devices with a touch screen, a touch input signal has been used to control the digital devices.

However, since in general, the above-mentioned controllers are only suitable for corresponding digital devices, it is difficult to control a specific digital device using a different controller rather than a controller for the specific digital device. Moreover, the digital device with the touch screen has a limitation in that a user should directly touch the digital device.

Meanwhile, a user can use a mobile device as a controller for another digital device after downloading and installing a related application on the mobile device. However, it has disadvantages in that the process for using the mobile device as the controller is quite complicated and in some cases, the process is restricted by circumstances such as a network, etc.

SUMMARY OF THE INVENTION

Accordingly, the present invention is directed to a device controller and data processing method thereof that substantially obviate one or more of the problems due to limitations and disadvantages of the related art.

One object of the present invention is to provide a device controller that can be commonly used for a plurality of digital devices.

Another object of the present invention is to provide a device controller capable of providing improved user convenience and enabling a user to input in an intuitive manner by implementing the device controller in a user-convenient manner.

A further object of the present invention is to improve the degree of design freedom of a device controller, whereby the device controller can be combined with other devices in various ways.

It will be appreciated by persons skilled in the art that the objects that could be achieved with the present invention are not limited to what has been particularly described hereinabove and the above and other objects that the present invention could achieve will be more clearly understood from the following detailed description Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a device controller for controlling a digital device according to the present invention includes a cover, an upper core part including an input unit, a lower core part including an interface unit, and a core including a core body combined with the upper core part and the lower core part. The core body includes a communication module configured to transmit and receive control signals for controlling the digital device, a first sensor module configured to sense motion data according to a movement of the device controller, a second sensor module configured to sense pressure applied to the core body, a control unit configured to control operations of the modules, collect data sensed by the sensor modules, generate a control signal based on the collected sensed data, and output feedback.

It is to be understood that both the foregoing general description and the following detailed description are exemplary and explanatory and are intended to provide further explanation of the invention as claimed.

Accordingly, the present invention provides the following effects and/or features.

According to an embodiment of the present invention, it is possible to provide a device controller that can be commonly used for a plurality of digital devices.

According to another embodiment of the present invention, it is possible to provide a device controller capable of providing improved user convenience and enabling a user to input in an intuitive manner by implementing the device controller in a user-convenient manner.

According to a further embodiment of the present invention, it is possible to improve the degree of design freedom of a device controller so that the device controller can be combined with other devices in various ways.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. The above and other aspects, features, and advantages of the present invention will become more apparent upon consideration of the following description of preferred embodiments, taken in conjunction with the accompanying drawing figures.

In the drawings:

FIGS. 4 to 7 are diagrams illustrating a device controller according to an embodiment of the present invention;

FIG. 9 is a diagram illustrating various forms of the device controller according to an embodiment of the present invention;

FIG. 10 is a diagram illustrating various control means of controlling the digital device according to an embodiment of the present invention;

FIG. 12 is a diagram for explaining a device or an application capable for data communication with the device controller according to an embodiment of the present invention;

FIG. 13 is a diagram illustrating motions of the device controller and definitions thereof according to an embodiment of the present invention;

FIGS. 14 and 15 are diagrams for explaining a VR control method using the device controller according to an embodiment of the present invention;

FIGS. 16 to 18 are diagrams for explaining a method of browsing a content list in a display device using the device controller according to an embodiment of the present invention;

FIGS. 25 to 27 are diagrams for explaining a method of controlling a drone using the device controller according to an embodiment of the present invention;

DETAILED DESCRIPTION OF THE INVENTION

Figure 1:
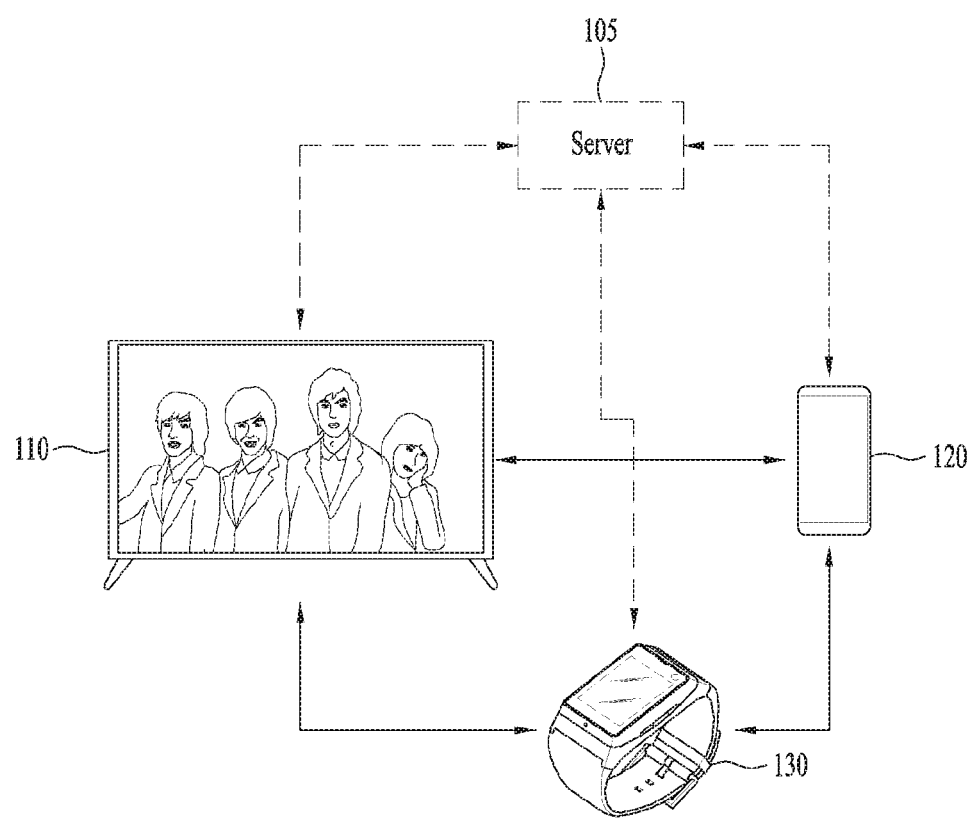
FIG. 1 a schematic diagram of a service system according to an embodiment of present invention.

Description will now be given in detail according to various embodiment(s) for a digital device and data processing method therein disclosed herein, with reference to the accompanying drawings.

Suffixes such as "module", "unit" and the like in this disclosure may be used to refer to elements or components. Use of such a suffix herein is merely intended to facilitate description of the specification, and both suffixes may be interchangeably usable. The description with ordinal numbers such as 'first~', 'second~' and the like is provided to facilitate the description of the corresponding terminologies only, which is non-limited by such terminologies or ordinal numbers. Although terminologies used in the present specification are selected from general terminologies used currently and widely in consideration of functions in the present invention, they may be changed in accordance with intentions of technicians engaged in the corresponding fields, customs, advents of new technologies and the like.

Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

Meanwhile, the descriptions disclosed in the present specification and/or drawings correspond to one preferred embodiment of the present invention and are non-limited by the preferred embodiment. And, the scope/extent of the right should be determined through the appended claims.

'Digital device' described in the present specification includes any device capable of performing at least one of transmission, reception, processing and output of contents for example. The digital device can receive the content or information on the content by streaming or download through a server (e.g., a broadcasting station), an external input or the like. The digital device may transmit/receive data including the content to/from the server or the like through a wire/wireless network. The digital device may include one of a fixed (or standing) device and a mobile device. The standing devices may include Network TV, HBBTV (Hybrid Broadcast Broadband TV), Smart TV, IPTV (Internet Protocol TV), PC (Personal Computer), etc. And, the mobile devices may include PDA (Personal Digital Assistant), Smart Phone, Tablet PC, Notebook, Digital Broadcast Terminal, PMP (portable multimedia player), Navigation, Slate PC, Ultrabook, Wearable Device (e.g., watch type terminal, glass type terminal, HMD (head mounted display), etc.

In the above description, the wire/wireless network described in the present specification includes all hardware and/or software for a connection, pairing, data communication and the like between a server and a digital device, and also includes all networks supported currently or all networks that will be supported in the future, by Standards. The wire/wireless network is capable of supporting one or more communication protocols for data communications. Such wire/wireless networks can be established by a network for a wire connection and a communication specification or protocol for the same (e.g., USB (Universal Serial Bus), CVBS (Composite Video Banking Sync), Component, S-video (analog), DVI (Digital Visual Interface), HDMI (High Definition Multimedia Interface), RGB, D-SUB, etc.) and a network for a wireless connection and a communication specification or protocol (e.g., Bluetooth, RFID (Radio Frequency Identification), IrDA (infrared Data Association), UWB (Ultra Wideband), ZigBee, DLNA (Digital Living Network Alliance), WLAN (Wireless LAN)(Wi-Fi), Wibro (Wireless broadband), Wimax (World Interoperability for Microwave Access), HSDPA (High Speed Downlink Packet Access), LTE/LTE-A (Long Term Evolution/LTE-Advanced), Wi-Fi direct).

Besides, a digital device may use a universal OS (operating system), a Web OS and the like. Hence, the digital device can process adding, deleting, amending, updating and the like of various services or applications on Universal OS kernel or Linux kernel, through which a further user-friendly environment can be configured and provided.

A device controller for controlling a digital device according to one embodiment of the present invention includes a cover, an upper core part including an input unit, a lower core part including an interface unit, and a core including a core body combined with the upper core part and the lower core part. The core body includes a communication module configured to transmit and receive control signals for controlling the digital device, a first sensor module configured to sense motion data according to a movement of the device controller, a second sensor module configured to sense pressure applied to the core body, a control unit configured to control operations of the modules, collect data sensed by the sensor modules, generate a control signal based on the collected sensed data, and output feedback.

Referring to FIG. 1, a service system can be implemented by including a plurality of digital devices 110, 120, and 130 that can communicate with each other, each of which can perform data communication. In this case, the service system may further include a server 105 for communication or data communication among the plurality of digital devices 110, 120, and 130 or at least one digital device of the plurality of the digital devices 110, 120, and 130. Meanwhile, the server 105 may be implemented using various processors or devices such as a gateway, a relay, a gap filler, a communication relay, etc. and also perform functions thereof.

Meanwhile, FIG. 1 shows, as the digital devices, a digital TV 110, a smartphone 120, and a smartwatch 130 only. However, according to the present invention, the digital devices may include various devices such as a camera, a keyboard, a headset, a sound bar, a speaker, a printer including a pocket photo, a vehicle, an air conditioner, an electric rice-cooker, an electric cleaner (or robot cleaner) and the like. The above-described digital devices can be controlled at one time or simultaneously through an immersive device controller according to the present invention instead of using device controllers respectively paired with the digital devices in advance. Details will be described later. In this document, the immersive device controller according to the present invention is simply referred to as a device controller for convenience of description, but the present invention is not limited thereto. In addition, the device controller according to the present invention is distinguished from a device controller dedicated to a corresponding digital device.

Figure 2:
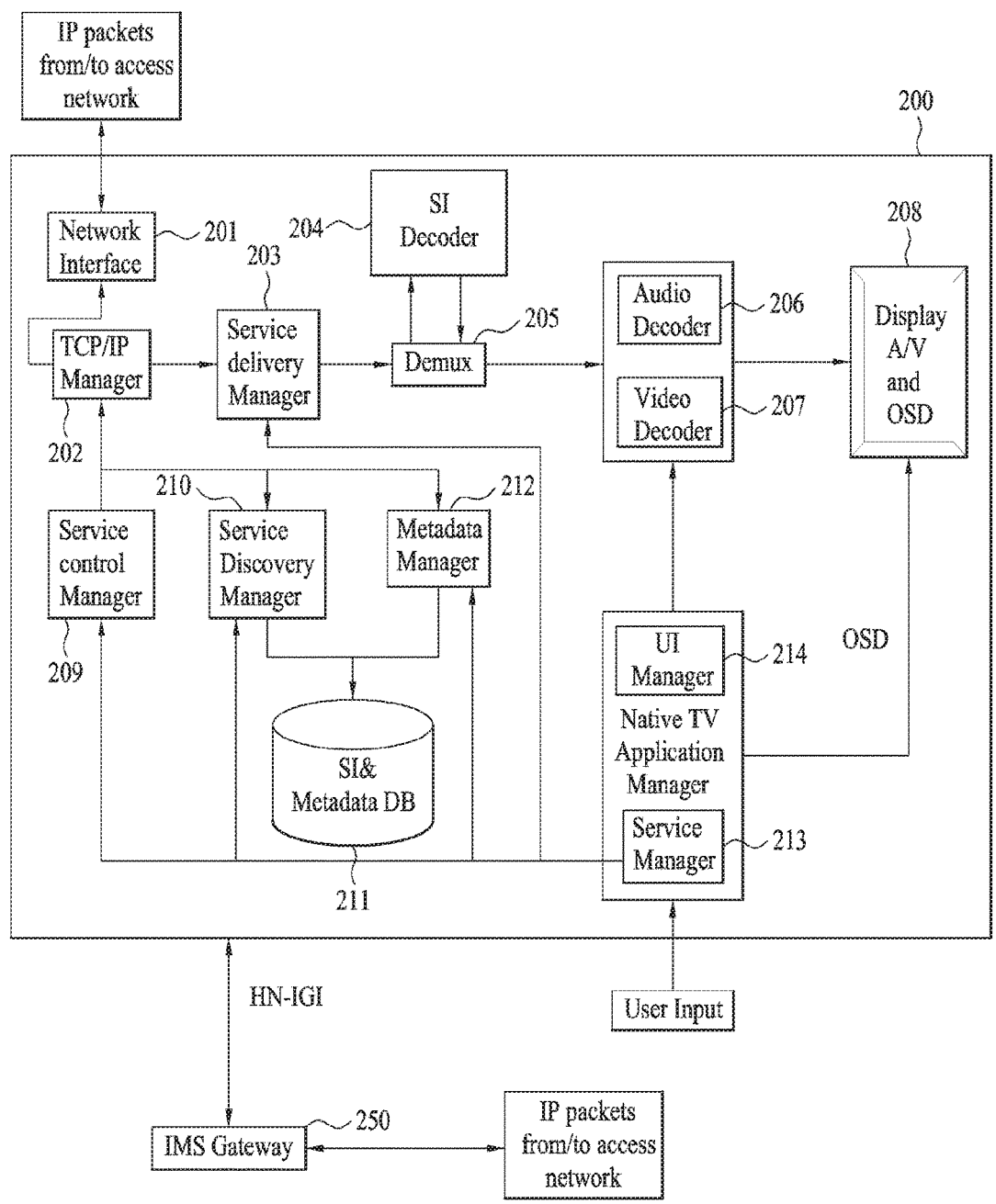
FIG. 2 is a block diagram of a digital TV performing data communication with a device controller according to an embodiment of the present invention.

FIG. 2 is a block diagram showing a digital TV according to one embodiment of the present invention.

In the following, referring to FIG. 2, the digital TV 200 may include a network interface 201, a TCP/IP manager 202, a service delivery manager 203, an SI decoder 204, a demuxer or demultiplexer 205, an audio decoder 206, a video decoder 207, a display A/V and OSD (On Screen Display) module 208, a service control manager 209, a service discovery manager 210, a SI & metadata database (DB) 211, a metadata manager 212, a service manager 213, a UI manager 214, etc.

The network interface 201 may transmit/receive IP (internet protocol) packet(s) or IP datagram(s) (hereinafter named IP pack(s)) to/from the server 105 through a network. For instance, the network interface 201 may receive services, applications, contents, broadcast programs and the like from the server 105 shown in FIG. 1 via such a medium as terrestrial, cable, satellite, IP and the like through a network.

The TCP/IP manager 202 may involve delivery of IP packets transmitted to the digital TV 200 and IP packets transmitted from the digital TV 200, that is, packet delivery between a source and a destination. The TCP/IP manager 202 may classify received packet(s) according to an appropriate protocol and output the classified packet(s) to the service delivery manager 205, the service discovery manager 210, the service control manager 209, the metadata manager 212, and the like.

The service delivery manager 203 may be in charge of controlling the received service data. The service delivery manager 203 may control real-time streaming data, for example, using Real-time Protocol/RTP Control Protocol (RTP/RTCP). In case of transmitting the real-time streaming data using RTP, the service delivery manager 203 may parse the received data packet according to the RTP and then transmits the parsed data packet to the demultiplexer 205 or save the parsed data packet to the SI & metadata DB 211 under the control of the service manager 213. The service delivery manager 203 may feed back the network reception information to the service providing server side using RTCP.

The demultiplexer 205 may demultiplex a received packet into audio data, video data, SI (System Information/Service Information/Signaling Information) data and the like and then transmit the demultiplexed data to the audio/video decoder 206/207 and the SI decoder 204, respectively.

The SI decoder 204 may decode the demultiplexed SI data, i.e., service informations of PSI (Program Specific Information), PSIP (Program and System Information Protocol), DVB-SI (Digital Video Broadcasting-Service Information), DTMB/CMMB (Digital Television Terrestrial Multimedia Broadcasting/Coding Mobile Multimedia Broadcasting), etc. And, the SI decoder 204 may save the decoded service informations to the SI & metadata DB 211.

The saved service information can be used by being read by a corresponding component in response to a user's request for example.

The audio decoder 206 and the video decoder 207 may decode the demultiplexed audio data and the demultiplexed video data, respectively. The decoded audio and video data may be provided to the user through the display unit 208.

The application manager includes a service manager 213 and a user interface (UI) manager 214 and is able to perform a function of a controller of the digital TV 200. So to speak, the application manager can administrate the overall states of the digital TV 200, provide a user interface (UI), and manage other mangers.

The UI manager 214 provides a graphical user interface/ user interface (GUI/UI) using OSD (on screen display) and the like. The UI manager 214 receives a key input from a user and then performs a device operation according to the input. For instance, if receiving a key input about a channel selection from a user, the UI manager 214 transmits the key input signal to the service manager 213.

The service manager 213 may control and manage service-related managers such as the service delivery manager 203, the service discovery manager 210, the service control manager 209, and the metadata manager 212. The service manager 213 creates a channel map and controls a selection of a channel and the like using the created channel map in response to a key input received from the UI manager 214. The service manager 213 may receive service information from the SI decoder 204 and then sets an audio/video Packet Identifier (PID) of a selected channel for the demultiplexer 205. Such a PID can be used for the demultiplexing procedure. Therefore, the demultiplexer 205 performs filtering (PID or section filtering) on audio data, video data and SI data using the PID.

The service discovery manager 210 may provide information required to select a service provider that provides a service. Upon receipt of a signal for selecting a channel from the service manager 213, the service discovery manager 210 searches for a service using the information.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service. The RTSP protocol can provide a trick mode for real-time streaming. And, the service control manager 209 may initialize and manage a session through the IMS gateway 250 using IMS (IP multimedia subsystem) and SIP (session initiation protocol). The protocols are exemplary, and other protocols are usable according to implementations.

The metadata manager 212 may manage metadata associated with services and save the metadata to the SI & metadata DB 211.

The SI & metadata DB 211 may store service information decoded by the SI decoder 204, metadata managed by the metadata manager 212, and information required to select a service provider, which is provided by the service discovery manager 210. In addition, the SI & metadata DB 211 can store system set-up data and the like for the system. The SI & metadata database 211 may be implemented with non-volatile RAM (NVRAM), flash memory and the like.

Meanwhile, an IMS gateway 250 is a gateway in which functions required for an access to an IMS based IPTV service are collected.

Figure 3:
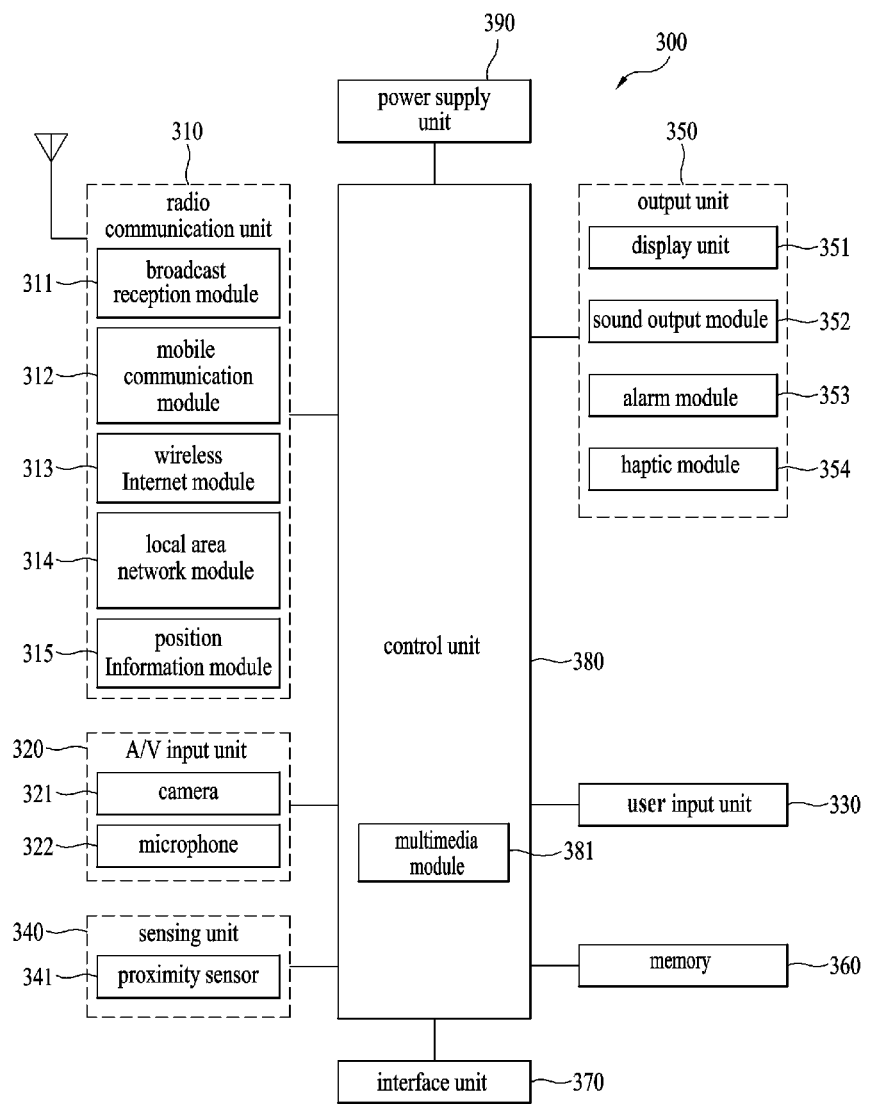
FIG. 3 is a block diagram of a mobile terminal performing data communication with a device controller according to an embodiment of the present invention.
Figure 5:
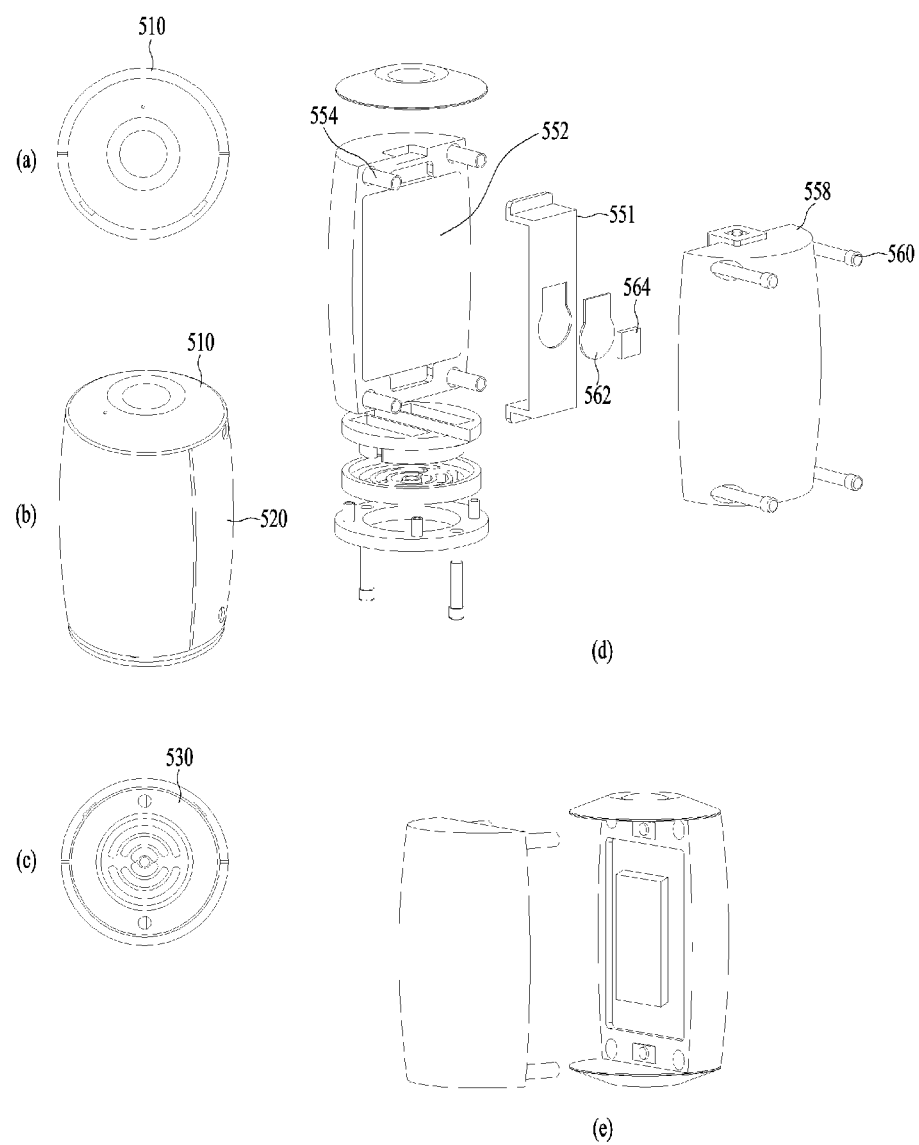

In FIG. 2, the network interface 201, at least one configuration of the application manager, a user interface 320 to be described in FIG. 3, one configuration of a wireless communication unit 410 or an interface 470 to be mentioned in FIG. 4, one configuration mentioned in FIG. 5 and the like may provide interfaces for communications or data communications with a user, other digital devices and the like and exchange data including control data with each other.

FIG. 3 is a block diagram showing a mobile terminal according to one embodiment of the present invention.

In FIG. 3, illustrated is a configuration block diagram of a mobile terminal 120 as another embodiment of the digital device shown in FIG. 1.

Referring to FIG. 3, the mobile terminal 300 includes a wireless communication unit 310, an A/V (audio/video) input unit 320, a user input unit 330, a sensing unit 340, an output unit 350, a memory 360, an interface unit 370, a controller 380, a power supply unit 390, etc.

The wireless communication unit 310 typically includes one or more modules which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, a location information module 315, etc.

The broadcast receiving module 311 receives a broadcast signal and/or broadcast associated information from an external broadcast managing server via a broadcast channel. The broadcast channel may include a satellite channel and a terrestrial channel. The broadcast managing server may mean a server generating to send a broadcast signal and/or broadcast associated information or a server receiving to send a pre-generated broadcast signal and/or broadcast associated information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal. The broadcast associated information may include information associated with a broadcast channel, a broadcast program, or a broadcast service provider. Furthermore, the broadcast associated information can be provided via a mobile communication network. In this case, the broadcast associated information can be received by the mobile communication module 312. The broadcast associated information can be implemented in various forms, e.g., an electronic program guide (EPG), an electronic service guide (ESG), and the like. The broadcast receiving module 311 may be configured to receive digital broadcast signals using broadcasting systems such as ATSC, DVB-T (Digital Video Broadcasting-Terrestrial), DVB-S (Satellite), MediaFLO (Media Forward Link Only), DVB-H (Handheld), ISDB-T (Integrated Services Digital Broadcast-Terrestrial), and the like.

Optionally, the broadcast receiving module 311 can be configured to be suitable for other broadcasting systems as well as the above-noted digital broadcasting systems. The broadcast signal and/or broadcast associated information received by the broadcast receiving module 311 may be saved to the memory 360.

The mobile communication module 312 transmits/receives wireless signals to/from at least one of a base station, an external terminal, and a server via a mobile network. Such wireless signals may carry audio signals, video signals, and data of various types according to transceived text/multimedia messages.

The wireless Internet module 313 includes a module for wireless Internet access and may be internally or externally coupled to the mobile terminal 400. The wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 314 is a module for short-range communications. Suitable technologies for implementing this module include Bluetooth, radio frequency identification (RFID), infrared data association (IrDA), ultra-wideband (UWB), ZigBee, RS-232, RS-385 and the like.

The location information module 315 is a module for obtaining location information of the mobile terminal 100. And, this module may be implemented with a global positioning system (GPS) module for example.

The audio/video (A/V) input unit 320 is configured to provide audio or video signal input. The A/V input unit 320 may include a camera 321, a microphone 322 and the like. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 460 or transmitted externally via the wireless communication unit 310.

Optionally, at least two cameras 321 can be provided according to the environment of usage.

The microphone 322 receives an external audio signal in call mode, recording mode, voice recognition mode, or the like. This audio signal is processed and converted into electrical audio data. The processed audio data is transformed into a format transmittable to a mobile communication base station via the mobile communication module 312 in call mode. The microphone 322 typically includes assorted noise cancelling algorithms to cancel noise generated in the course of receiving the external audio signal.

The user input unit 330 generates input data for a user to control an operation of the terminal. The user input unit 330 may include a keypad, a dome switch, a touchpad (e.g., static pressure/capacitance), a jog wheel, a jog switch, and/or the like.

The sensing unit 340 generates sensing signals for controlling operations of the mobile terminal 300 using status measurements of various aspects of the mobile terminal. For instance, the sensing unit 340 may detect an open/closed status of the mobile terminal 300, a location of the mobile terminal 300, an orientation of the mobile terminal 300, a presence or absence of user contact with the mobile terminal 300, an acceleration/deceleration of the mobile terminal 300, and the like. For example, if the mobile terminal 300 is moved or inclined, it is able to sense a location or inclination of the mobile device. Moreover, the sensing unit 340 may sense a presence or absence of power provided by the power supply unit 390, a presence or absence of a coupling or other connection between the interface unit 370 and an external device, and the like. Meanwhile, the sensing unit 340 may include a proximity sensor 341 such as NFC (near field communication) and the like.

The output unit 350 generates output relevant to the senses of vision, hearing and touch, and may include the display 351, an audio output module 352, an alarm unit 353, a haptic module 354, and the like.

The display 351 is typically implemented to visually display (output) information processed by the mobile terminal 300. For instance, if the mobile terminal is operating in phone call mode, the display will generally provide a user interface (UI) or graphical user interface (GUI) related to a phone call. For another instance, if the mobile terminal 300 is in video call mode or photographing mode, the display 351 may display photographed or/and received images or UI/GUI.

The display 351 may include at least one of a liquid crystal display (LCD), a thin film transistor-liquid crystal display (TFT-LCD), an organic light-emitting diode display (OLED), a flexible display and a three-dimensional display.

Some of the displays can be implemented in a transparent or optical transmittive type, which can be called a transparent display. A representative example of the transparent display is the TOLED (transparent OLED). A rear configuration of the display 351 can be implemented as the optical transmittive type as well. In this configuration, a user may be able to see an object located in rear of a terminal body through a region occupied by the display 351 of the terminal body.

Two or more displays 351 can be provided to the mobile terminal 300 in accordance with an implementation type of the mobile terminal 300. For instance, a plurality of displays can be disposed on the mobile terminal 300 in a manner of being spaced apart from a single face or being integrally formed on a single face. Alternatively, a plurality of displays may be disposed on different faces of the mobile terminal 300, respectively.

If the display 351 and a sensor (hereinafter called 'touch sensor') for detecting a touch action configure a mutual layer structure, the display 351 is usable as an input device as well as an output device. In this case, the touch sensor can be configured with a touch film, a touch sheet, a touchpad, or the like.

The touch sensor can be configured to convert a pressure applied to a specific portion of the display 351 or a variation of capacitance generated from a specific portion of the display 351 into an electrical input signal.

Moreover, the touch sensor is configurable to detect pressure of a touch as well as a touched position or size.

If a touch input is applied to the touch sensor, signal(s) corresponding to the touch input is transferred to a touch controller. The touch controller processes the signal(s) and then transfers the processed signal(s) to the controller 380. Therefore, the controller 380 is able to know whether a prescribed portion of the display 351 is touched.

A proximity sensor 341 can be disposed on an inner region of the mobile device enclosed by the touchscreen or near the touchscreen. The proximity sensor is a sensor that detects a presence or non-presence of an object approaching a prescribed detecting surface or an object existing around the proximity sensor using an electromagnetic field strength or infrared ray without mechanical contact. Hence, the proximity sensor is more durable than a contact type sensor and also has utility higher than that of the contact type sensor.

The proximity sensor may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, etc. If the touch screen includes the electrostatic capacity proximity sensor, it is configured to detect the proximity of a pointer using a variation of an electric field according to the proximity of the pointer. In this configuration, the touchscreen (or touch sensor) can be sorted into a proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or stored in the memory 360. During operation, the audio output module 352 may output an audio signal related to a function (e.g., call received, message received) executed in the mobile terminal 300. The audio output module 352 may include a receiver, a speaker, a buzzer and the like.

The alarm unit 353 outputs a signal for announcing the occurrence of an event of the mobile terminal 300. Typical events occurring in the mobile device may include a call signal received, a message received, a touch input received, and the like. The alarm unit 353 may output a signal for announcing the event occurrence by way of vibration as well as video or audio signal.

The video or audio signal can be outputted via the display 351 or the audio output module 352. Hence, the display 351 or the audio output module 352 can be sorted into a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence. The haptic module 354 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 can be implemented to enable a user to sense the tactile effect through a muscle sense of a finger or an arm as well as to transfer the tactile effect through direct contact. Optionally, two or more haptic modules 354 can be provided to the mobile terminal 300 in accordance with a configuration type of the mobile terminal 300.

The memory 360 may store a program for an operation of the controller 380, or may temporarily store inputted/outputted data (e.g., phonebook, message, still image, video, etc.). And, the memory 360 may store data of vibrations and sounds of various patterns outputted in response to a touch input to the touchscreen.

The memory 360 may be implemented using any type or combination of suitable volatile and non-volatile memory or storage devices, including hard disk, RAM, SRAM, EEPROM, EPROM, PROM, ROM, magnetic memory, flash memory, magnetic or optical disk, multimedia card micro type memory, card-type memory (e.g., SD memory or XD memory), or other similar memory or data storage device. Furthermore, the mobile terminal 300 is able to operate in association with the web storage for performing a storage function of the memory 360 on the Internet.

The interface unit 370 may play a role as a passage to every external device connected to the mobile terminal 300 with external devices. The interface unit 370 receives data from the external devices, delivers a supplied power to the respective elements of the mobile terminal 300, or enables data within the mobile terminal 300 to be transferred to the external devices. For instance, the interface unit 370 may include a wired/wireless headset port, an external charger port, a wired/wireless data port, a memory card port, a port for coupling to a device having an identity module, audio input/output ports, video input/output ports, an earphone port, and the like.

The identity module is a chip for storing various kinds of information for authenticating a use authority of the mobile terminal 300 and may include User Identify Module (UIM), Subscriber Identity Module (SIM), Universal Subscriber Identity Module (USIM), and the like. A device having the identity module (hereinafter called 'identity device') can be manufactured in form of a smart card. Therefore, the identity device is connectible to the mobile terminal 300 through a port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals inputted from the cradle or the power can operate as a signal for recognizing that the mobile terminal 300 is correctly installed in the cradle.

The controller 380 typically controls the overall operations of the mobile terminal 300. For example, the controller 380 performs the control and processing associated with voice calls, data communications, video calls, and the like. The controller 380 may include a multimedia module 381 that provides multimedia playback. The multimedia module 381 may be configured as a part of the controller 380, or implemented as a separate component.

Moreover, the controller 380 is able to perform a pattern recognition processing for recognizing a writing input and a picture drawing input performed on the touchscreen as a text and an image, respectively.

The power supply unit 390 is supplied with an external or internal power and then supplies a power required for an operation of each component, under the control of the controller 380.

Various embodiments described herein may be implemented in a recording medium readable by a computer or a device similar to the computer using software, hardware, or some combination thereof for example.

For hardware implementation, the embodiments described herein may be implemented within at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and a selective combination thereof. Such embodiments may also be implemented by the controller 380.

For software implementation, the embodiments described herein may be implemented with separate software modules, such as procedures and functions, each of which performs one or more of the functions and operations described herein. The software codes can be implemented with a software application written in any suitable programming language and may be stored in memory such as the memory 360, and executed by a controller or processor, such as the controller 380.

Meanwhile, beyond the dimension of user's hand-held use, a wearable device wearable on a body may operate or function as a digital device or an external device in the present specification. Such wearable devices may include a smart watch, smart glasses, an HMD and the like.

As shown in FIG. 1, a wearable device may exchange data with or interwork with another device mutually. The short-communication module 314 may detect (or recognize) a communication enabled wearable device around. If the detected wearable device is a device authenticated to communicate with the mobile terminal 300, the controller 380 may send at least one portion of data processed in the mobile terminal 300 to the wearable device. Hence, a user can use the data processed in the mobile terminal 300 through the wearable device. For instance, if an incoming call is received by the mobile terminal 300, a phone call is performed through the wearable device. If a message is received by the mobile terminal 300, the received message can be checked through the wearable device.

Hereinafter, a device controller and data processing method thereof according to the present invention will be described in detail with reference to the accompanying drawings. In addition, configurations and structures of the embodiments of the present invention are merely exemplary and the invention is not limited thereto.

FIGS. 4 to 7 are diagrams illustrating a device controller according to an embodiment of the present invention.

FIG. 4a shows a basic form of device controller according to an embodiment of the present invention and FIG. 4b shows a core of the device controller according to an embodiment of the present invention.

Referring to FIG. 4a, the device controller includes a core 410 and a cover 420.

Referring to FIG. 4b, the core 410 may be implemented in the form of a cylinder with a prescribed diameter x and a height y where x and y are positive values greater than 1 mm. For convenience of description, x is assumed to be a value in the range of 30 to 40 mm and y is assumed to be a value in the range of 50 to 60 mm. However, the invention is not limited thereto. Moreover, the shape of the core 410 is not limited to the cylinder form. For example, the core 410 may be implemented in various forms such as a rectangle, a square, a circular cone, a triangular pyramid, etc.

FIG. 5 is a diagram illustrating the core and interior components thereof.

FIGS. 5a to 5c shows an upper core part 510, a core body 520, and a lower core part 530, respectively. Here, the upper core part 510 and the lower core part 530 are named for convenience and clarity of description and thus, they may have various names such as a first component and a second component.

The upper core part 510 of FIG. 5a may include a button 512. As a user input interface, the button 512 can be used to deliver a signal generated in the user input interface to the core body 520.

The lower core part 530 of FIG. 5c is paired with the upper core part 510 and may include an interface unit 532. In this case, the interface unit 532 provides an interfacing environment such as a USB, a micro USB, a POGO pin, a connector, etc. and may perform a charge port function for the device controller. Further, the interface unit 532 may have a structure capable of being combined with external accessories to provide function extensibility.

Meanwhile, at least one of the upper core part 510 of FIG. 5a and the lower core part 520 of FIG. 5c may have a structure capable of being combined with the core body 520. That is, the upper core part 510 and the lower core part 530 may be replaced with a different component having a different structure or function.

The core body 520 of FIG. 5b is combined with the upper core part 510 and the lower core part 530 to implement the core.

Details of the core body 520 will be described with reference to FIGS. 5d and 5e.

Referring to FIG. 5d, for example, the core body 520 according to the present invention may be configured with a first core body cover and a second core body cover.

The core body 520 includes a module unit 552 including a communication module, a sensor module, etc. and an elastic body 554.

In this case, the communication module can support various wired/wireless communication protocols such as Wi-Fi, Bluetooth, Zigbee, Z-wave, UART, RS-232, RS-485, USB, etc. to support data communication with a paired or connected digital device The sensor module may be a three-axis, six-axis, or nine-axis sensor. For convenience of description, the sensor module is assumed to be the nine-axis sensor including a gyro sensor, an acceleration sensor, a terrestrial magnetic sensor, and the like. Thus, the sensor module may sense azimuth orientation, movement, direction, acceleration, motion and the like of the device controller.

The elastic body 554 may correspond to an object capable of measuring pressure based on elasticity and be made of materials such as a magnetic spring, a spring, a conductive string, an electronic textile, etc. The elastic body 554 is compressed by grab strength applied to the core body 520. Thereafter, when the grab is released, the elastic body 554 is restored. In this case, the elastic body 554 may sense pressure based on the degree of the compression. After the pressure is sensed, a prescribed control signal may be generated. Details will be described later.

Additionally, the core body 520 may further include an actuator, a tact key, a pressure sensor, etc.

The actuator may be included in the module unit 552. In addition, the actuator may include a vibrator, a compressor, a motor, etc. to provide feedback to a user that grabs the device controller. In this case, the feedback may have been provided in various ways such as vibration, sound, etc. and required components may be further included. In addition, the feedback may be provided to the user such that the user has a feeling of grabbing an object, a feeling of weight, or a feeling of resistance.

The tact key 566 may be used to recognize whether the entirety of the core body 520 is grabbed.

The pressure sensor 562 and 564 may be made of materials capable of sensing pressure such as an electronic textile, FSR, a conductive string, etc. In addition, the pressure sensor 562 and 564 may sense a value of the pressure of grabbing the device controller.

The first core body cover 550 and the second core body cover 560 may be combined with each other.

FIG. 5e is almost same as FIG. 5d but inner components of FIG. 5e is slightly different from those of FIG. 5d. For example, a battery module for power supply may be included or the components described with reference to FIG. 5d may be slightly changed.

FIG. 6a is a cross-sectional view of the device controller according to an embodiment of the present invention and FIG. 6b is a configuration view of the core.

Referring to FIG. 7, a motor 710 shown in FIG. 7e is mounted on at least one of the first and second core body covers of the core body 520 to adjust a size of the device controller, particularly, the core body 520 relating to a prescribed event or feedback.

Referring to FIGS. 7a and 7b, the size of the device controller can be changed by change in the core body so that the user has a feeling of volume when the user grabs the device controller. For example, based on information on an object size in VR space, the device controller may change its size in proportional to the object size. Alternatively, the device controller may adjust its size in consideration of a user's hand. For example, when the user initiates adjustment of the size of the device controller, the device controller may change its size while the user easily holds the device controller with the hand. Thereafter, the device controller senses pressure from the user' hand in order to change its size to an optimal size.

Additionally, the adjustment of the size of the device controller may be used for various purposes including feedback.

Referring back to FIGS. 7a and 7b, the first and second core body covers constituting the core body perform a first operation in a first mode corresponding to a common mode using the motor. Through the first operation, the first and second core body covers of the core body can be combined with each other or be placed in a first position.

Referring to FIGS. 7c and 7d, the first and second core body covers constituting the core body perform a second operation in a second mode using the motor. Through the second operation, the first and second core body covers of the core body can be detached from each other or be placed in a second position.

The first and second positions may be determined according to the corresponding modes. For convenience of description, the first position is defined as a position where the core body covers of the core body can be combined or the core body covers are close to each other enough to be combined with each other. That is, the first position may mean that the core body of the digital device is compressed. On the other hand, the second position may mean at least one position among positions where the core body covers of the core body can be placed as far as possible. In this case, a distance d2 between the core body covers can be determined based on the configuration. In other words, as shown in FIGS. 7b and 7d, a distance d1 between the core body covers in the first mode may be shorter than the distance d2 between the core body covers in the second mode, that is, the distance d2 is longer than the distance d1. In addition, the distance d2 may be determined within a maximum distance configured by the device controller.

Although FIG. 7 shows the use of the motor 710, other components can be replaced with the motor 710 to perform the aforementioned operations.

The description of FIG. 7a could be reversed with the description of FIGS. 7c and 7b.

Figure 8:
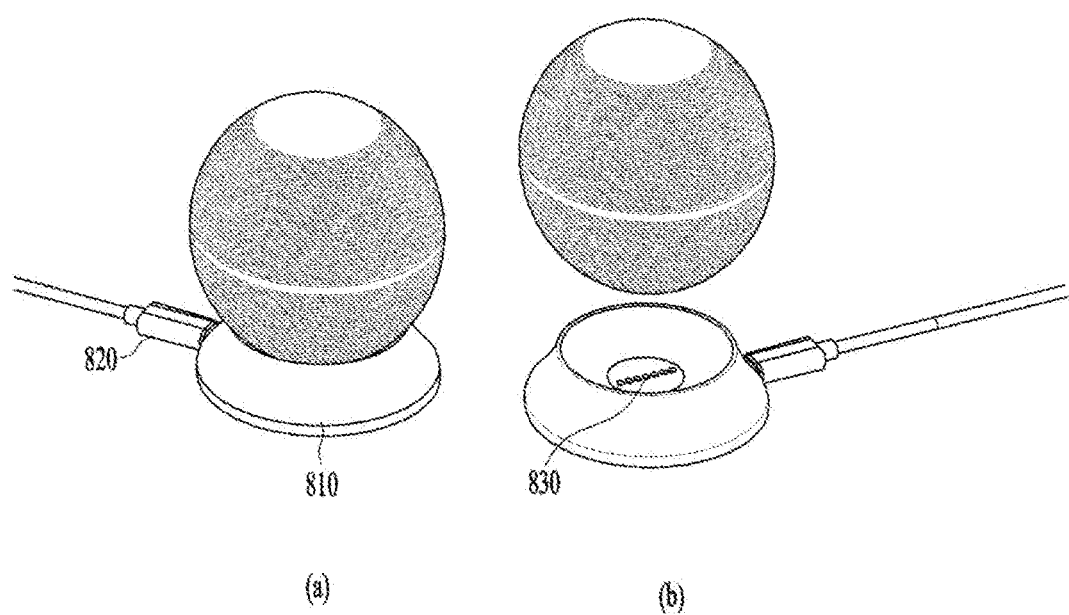
FIG. 8 is a diagram illustrating the device controller and a connecter therefor according to an embodiment of the present invention.

FIG. 8 is a diagram illustrating the device controller and a connecter therefor according to an embodiment of the present invention.

Referring to FIGS. 8a and 8b, the connector includes a fixing part 810 for fixing the device controller and an interface unit 830 connected to a charging cable 820 for charging the device controller while the device controller is connected to the fixed part 810. The fixing part 810 may include the interface unit 830, which is connected to a charging connector of the device controller and delivers power supplied through the charging cable 820 to the device controller. Additionally, the fixing part 810 may be implemented in the form that matches that of the device controller to fix the device controller.

FIG. 9 is a diagram illustrating various forms of the device controller according to an embodiment of the present invention. In this case, the forms illustrated in FIG. 9 may correspond to the device controller or a device combined with the device controller.

Except the core body of the device controller mentioned with reference to FIGS. 4 to 8, an exterior cover may be made in various forms or of various materials. For example, the exterior cover may be made of rigid materials such as plastic and stainless steel or soft materials such as sponges.

FIGS. 9a to 9d shows that the core body of the device controller is combined with various exterior covers and FIG. 9e shows that the code body is combined with a chair.

FIG. 10 is a diagram illustrating various control means of controlling the digital device according to an embodiment of the present invention.

FIG. 10a is a schematic diagram illustrating an interior configuration of the device controller. In this case, an exterior cover 1040 may be a soft cover for allowing the user to grab the device controller as shown in FIG. 10 b. In addition, referring to FIG. 10a, the core body may include a nine-axis sensor 1010, a pressure sensor 1020, a vibrator, and the like. That is, the device controller may detect pressure caused when the user grabs the device controller as shown in FIG. 10 b and recognize motions shown in FIGS. 10c to 10e. In addition to the grab pressure and the motion recognition, the device controller may also include a button 1030 to provide user convenience when the user uses other devices such as a VR device, a drone, a robot, etc.

FIG. 10b shows that the user grabs the device controller with the soft cover. In this case, the grabbing of the device controller may replace functions of the aforementioned button of the device controller.

FIG. 10c shows a free movement of the device controller. In this case, the free movement of the device controller may be mapped to a cursor movement, a gesture movement, or an orientation movement.

FIG. 10d shows that the user moves the device controller while grabbing the device controller. In this case, multiple pressure levels may be defined with respect to pressure caused by the grabbing. Further, a speed sensor may be integrated, and a command input may be continuously inputted.

FIG. 10e shows tactile feedback of the device controller. In this case, a VR device may provide a function of virtual sensing with respect to touch, grab, size, or volume.

The description of FIG. 10 is merely exemplary, and the present invention is not limited thereto.

Figure 11:
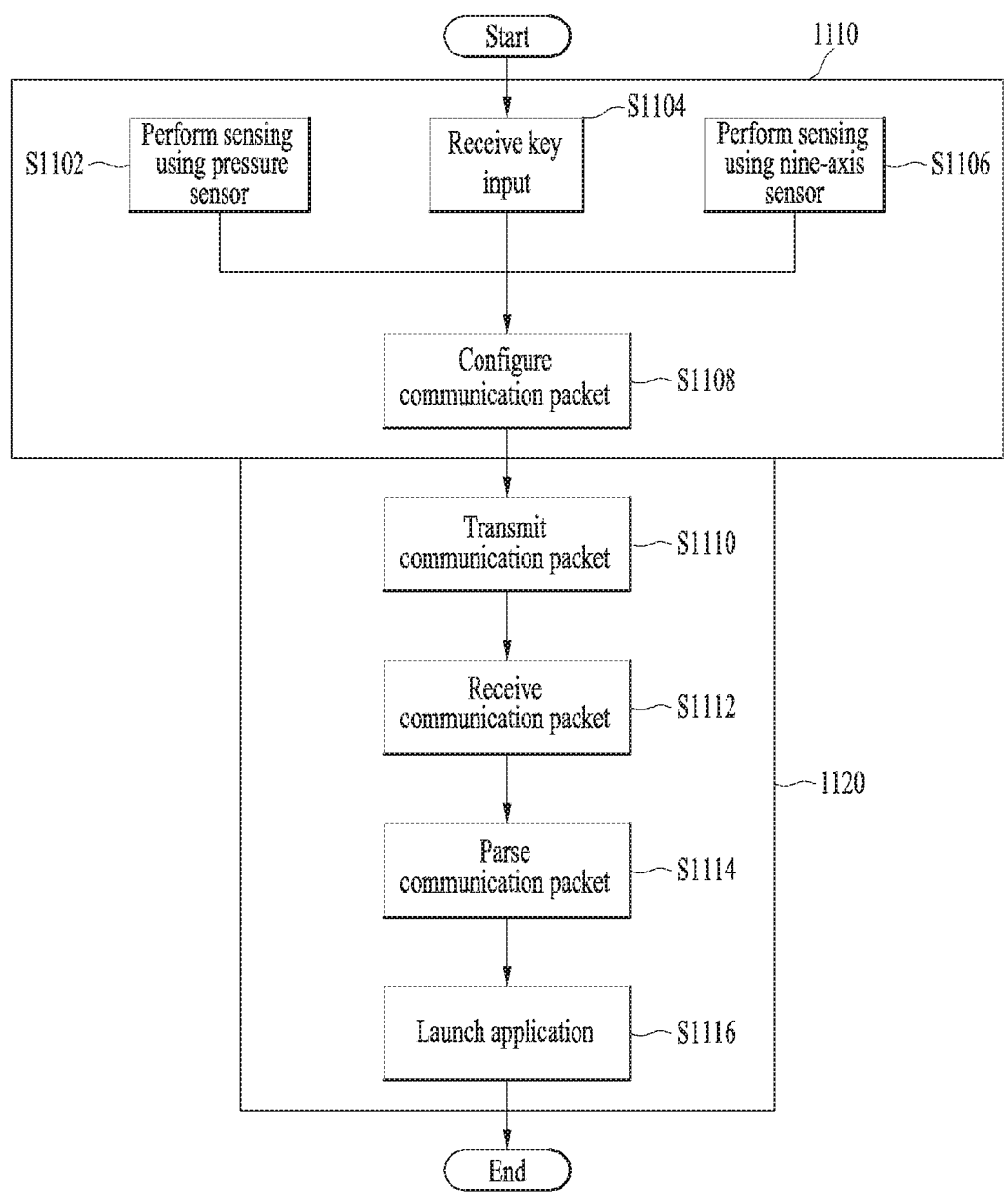
FIG. 11 is a flowchart illustrating data communication between a device controller and a digital device according to an embodiment of the present invention.

FIG. 11 is a flowchart illustrating data communication between a device controller and a digital device according to an embodiment of the present invention.

Referring to FIG. 11, when there is pressure such as grabbing of a device controller 1110, the device controller 1110 senses the pressure through a pressure sensor [S1102]. When there is a key input, the device controller 1110 receives the key input [S1104]. When there is a movement of the device controller 1110, the device controller 1110 detects the movement through a nine-axis sensor [S1106]. The steps S1102, S1104, and S1106 may be combined in any form and performed at the same time or different times according to an event of the device controller. That is, the order of the steps is random.

After performing at least one of the steps S1102, S1104, and S1106, the device controller 1110 collects data based on the corresponding results and then configures a communication packet to be transmitted to a digital device 1120 based on the collected data [S1108]. Thereafter, the device controller 1110 transmits the configured communication packet to the digital device 1120 [S1110].

After receiving the transmitted communication packet [S1112], the digital device 1120 parses the received communication packet [S1114]. After parsing, the digital device 1120 may perform a prescribed operation based on data included in the communication packet and then provide feedback. As the prescribed operation, the digital device 1120 may launch an application [S1116].

FIG. 12 is a diagram for explaining a device or an application capable for data communication with the device controller according to an embodiment of the present invention.

FIG. 12a shows a web browser, FIG. 12b shows a video player, FIG. 12c shows a game device, FIG. 12d shows a drone, and FIGS. 12e and 12f shows robots. It is apparent that the device controller according to the present invention is not limited thereto.

FIG. 13 is a diagram illustrating motions of the device controller and definitions thereof according to an embodiment of the present invention.

Specifically, FIG. 13 shows types of motions of the device controller according to the present invention and operations performed by the individual motions according to an embodiment of the present invention. It is apparent that the motions illustrated in FIG. 13 are merely exemplary, other motions can be included, and the definitions of the individual motions can also be changed.

FIGS. 13a and 13b shows definitions of various motions such as a grab motion, a button motion, and the like of the device controller with reference to x-y-z axis of FIG. 13d. In FIGS. 13a and 13b, simple motions on x-y, y-z, and x-z axes, grab motions, motions on the x-y, y-z, and x-z axes while the device controller is grabbed, rotation motions, button click motions, and combinations thereof are defined.

Meanwhile, unlike the motions of the device controller shown in FIGS. 13a and 13b, FIG. 13c shows bump motions, i.e., motions performed using not only the device controller but also, for example, user's hands.

Figure 15:
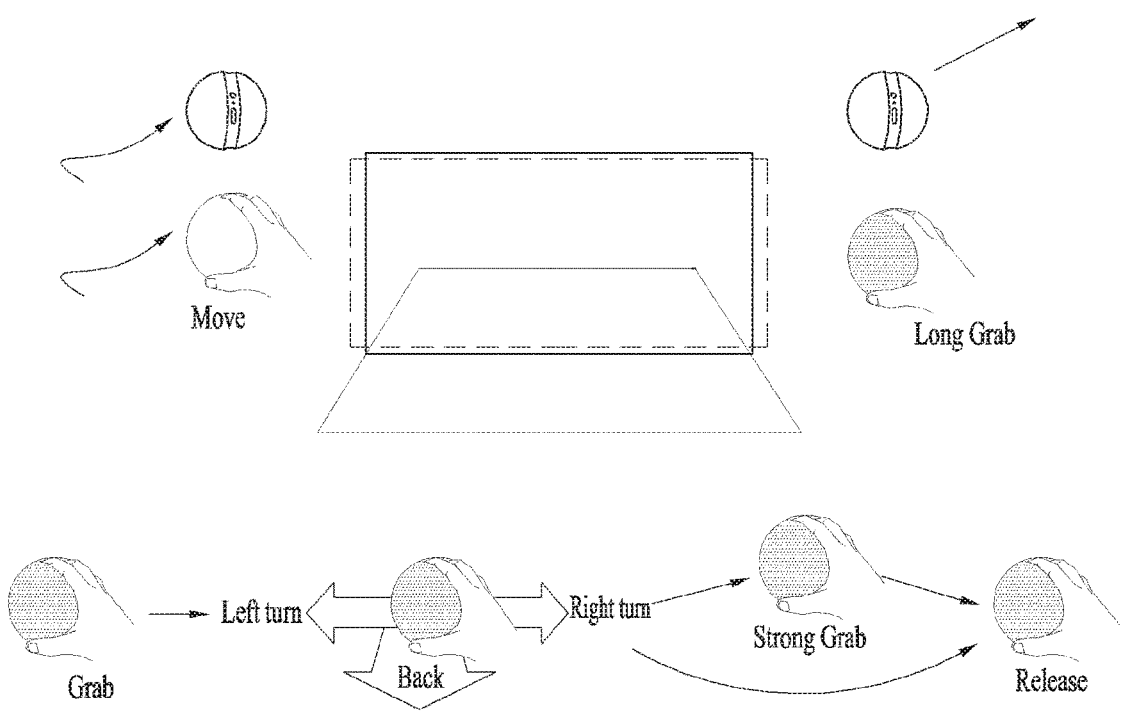

FIGS. 14 and 15 are diagrams for explaining a Rolling Bot/VR control method using the device controller according to an embodiment of the present invention.

Specifically, FIGS. 14 and 15 shows processes for controlling a digital device (first device) such as Rolling Bot or a drone using the device controller according to the present invention. In this case, it is assumed that a user of the device controller currently watches the first person view of the Rolling Bot or the drone through an extra display device (including VR) (second device).

If a motion of the device controller is detected after the first person view of FIG. 14a is provided, the display device may display a virtual horizontal line or a virtual plane on the first person view. In this case, for example, if the user performs a rotation motion with the device controller in place, the device controller may collect a sensing value with respect to the rotation motion and then transmit, to the first device, a control command or a control signal including the control command (hereinafter referred to as a control signal) based on the collected sensing value. After receiving the control signal, the first device parses the received control signal and then performs an operation corresponding to the control command included in the control signal. That is, the first device performs a rotation movement according to the rotation motion of the device controller (in this case, a rotation direction of the first device is the same as that of the device controller).

Referring to FIG. 14, if the user performs a motion of bumping a hand (e.g., right hand) that holds the device controller against a vertical plane of another hand (e.g., left hand), the device controller may collect sensing data with respect to the bumping motion, generate a control signal based on the collected sensing data, and then transmit the control signal to the first device. After receiving the control signal, the first device extracts a control command by parsing the received control signal, performs a relevant motion (e.g., a motion of returning to the user) by decoding the extracted control command.

Referring to FIG. 15, when the user simply moves the device controller, the first device performs a relevant movement. In particular, when the user performs a motion of moving the device controller on the x-y-z axis, the first device may perform a motion corresponding to the motion of the device controller. In addition, when the device controller moves from a first point to a second point on the x-y-z axis, the first device may move at the same distance or at the same ratio based on the motion distance of the device controller in a random or prescribed manner. For example, if the device controller moves about 10 cm in the horizontal direction, the first device may move 10 cm or 1 m from the current position in the horizontal direction or in the right direction of the current movement direction.

In addition, as shown in FIG. 15, if the user grabs the device controller during a predetermined time (i.e., performs a long grab), the first device can maintain the current operation.

As an example of an operation scenario of the device controller, if the user grabs the device controller while the first device performs no operation, the first device may initiate an operation (e.g., forward movement). Thereafter, if the user performs motions for left turn, right turn, and backward movement, the first device performs relevant operations. If the user strongly grabs the device controller (i.e., perform a strong grab) during or after the above process while the first device operates, the user may control an operating speed of the first device based on grab strength. Thereafter, if the user releases the grab of the device controller, the first device may stop the operation or go back to a predetermined position.

When the first device is controlled by the user through the device controller as described above, the second device displays a relevant information on the virtual plane of the first person view. In this case, the second device may configure the first person view or the virtual plane by receiving the data sensed by the first device.

Meanwhile, the first person view and the virtual plane thereof may be determined based on the motions of the device controller or the operations of the first device, which correspond to the motions of the device controller. In this case, the first view may be maintained whereas the virtual plane may be changed.

Figure 16:
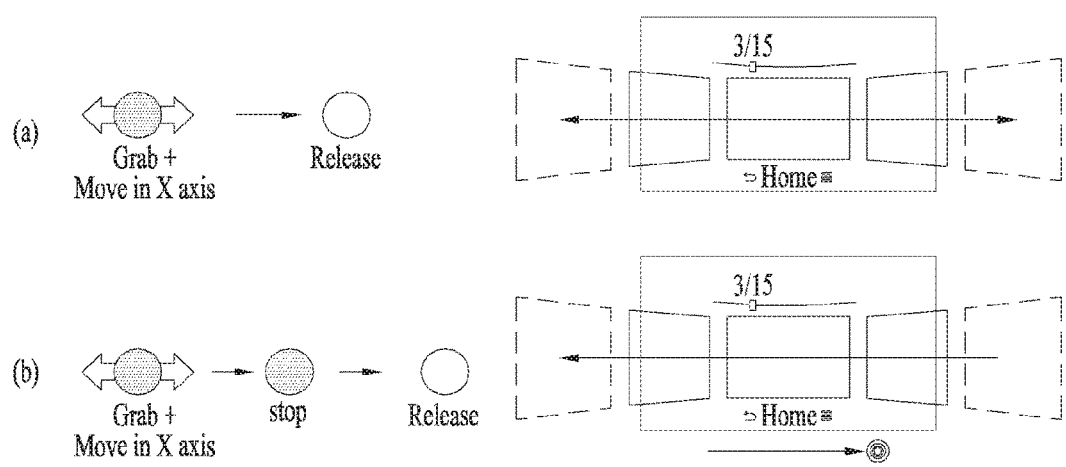
Figure 18:
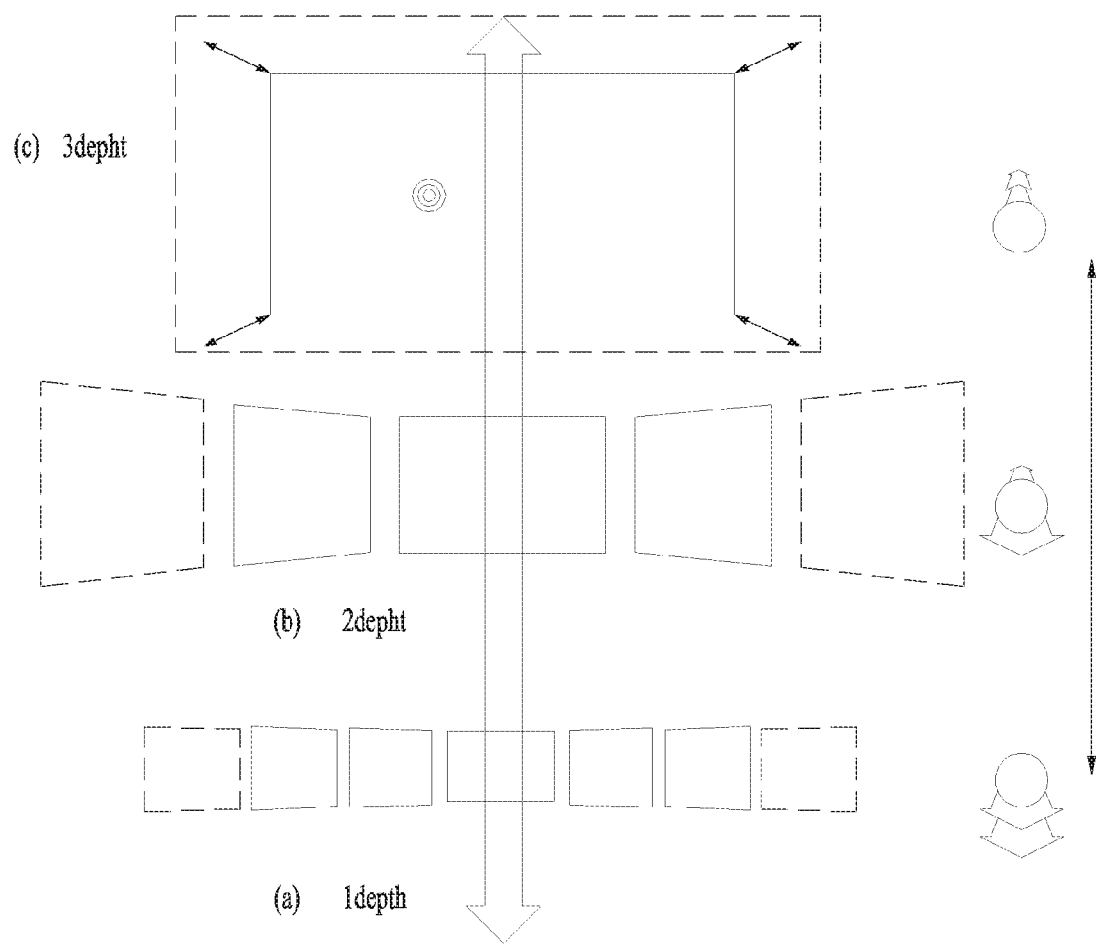
Figure 19:
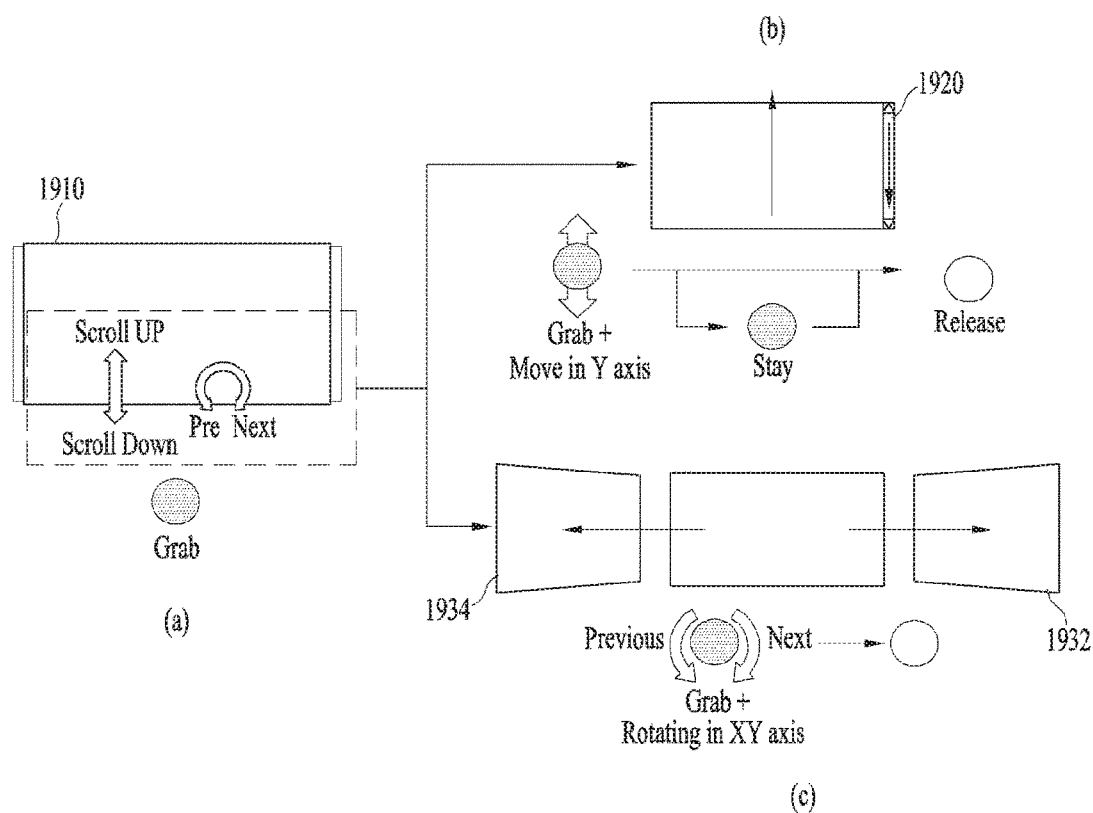
FIG. 19 is a diagram for explaining a gesture control method for a display device through the device controller according to an embodiment of the present invention.
Figure 20:
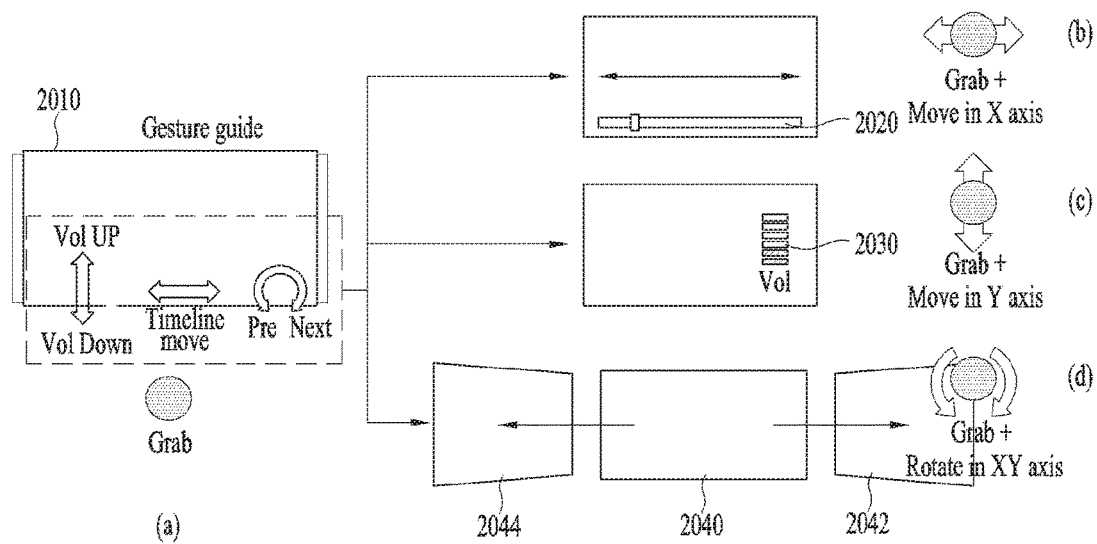
FIG. 20 is a diagram for explaining a video playback control method for a display device through the device controller according to an embodiment of the present invention.

FIGS. 16 to 18 are diagrams for explaining a method of browsing a content list in a display device using the device controller according to an embodiment of the present invention. FIGS. 19 and 20 are diagrams for explaining a gesture control method for a display device through the device controller according to an embodiment of the present invention.

FIGS. 16 to 20 shows embodiments in which a user controls an application screen, a menu screen, and the like displayed on a display device (second device) using the device controller while watching the second device. In this case, the device controller may be replaced with, for example, a remote controller for controlling a TV.

First, a method of browsing an application list displayed on the second device will be described with reference to FIGS. 16a and 16b.

Referring to FIG. 16a, when the user grabs the device controller, the device controller senses grab strength and then operates in an application list control mode according to the sensed grab strength. If the user moves the device controller in an x-axis direction (i.e., horizontal direction) while grabbing the device controller, each page of the application list is browsed in the left direction or the right direction. In addition, when the user releases the grab of the device controller, the browsing of the application list is ended.

Referring to FIG. 16b, when the user grabs the device controller, the device controller operates as described with reference to FIG. 16a. However, when the user stops the movement in the x-axis direction without releasing the grab, the browsing is not ended, that is, the application list is continuously browsed in the x-axis direction. The browsing is ended only when the user releases the grab of the device controller.

To continuously perform the browsing even when the motion of the device controller is stopped unlike FIG. 16a, conditions such as a predetermined time, a predetermined distance, or a predetermined range may be configured in FIG. 16b. However, since it is difficult for the user to identify the conditions, a continuous page mode configuration icon can be provided as shown in FIG. 16 b when the conditions are satisfied.

FIG. 17 illustrates an embodiment in which the second device performs zoom-in/out based on data related to the sensed grab strength. A grab strength value for determining either zoom-in or zoom-out may be configured either automatically or manually and in the present invention, the grab strength value for determining either zoom-in or zoom-out is defined as a threshold value.

Referring to FIG. 17a, when the user moves the device controller in the x-axis direction while grabbing the device controller with pressure less than the threshold value after the application list is provided by the second, the entirety of the provided application list is zoomed in. That is, a size of each page may be enlarged but the number of applications provided on the screen may be reduced. Here, the number of the provided applications may imply a maximum number of applications that the user can check through the second device at once.

Referring to FIG. 17b, when the user moves the device controller in the x-axis direction while grabbing the device controller with pressure equal to or greater than the threshold value after the application list is provided by the second, the entirety of the provided application list is zoomed out. That is, the size of each page may be reduced but the number of the applications provided on the screen may be increased.

Meanwhile, the aforementioned control method based on grab strength may be used to change not only the size but also resolution or color. Additionally, zoom-in/out, resolution, color may be determined based on the number of grabs during a predetermined time or the number of grabs without time limitation instead of sensing the grab strength.

Unlike FIGS. 16 and 17 that illustrate embodiments for controlling motions in the x-axis direction, FIG. 18 shows an embodiment for controlling motions in a z-axis direction.

For example, if a content list, a menu list, or an application list displayed on the second device has a plurality of depths, the second device provides brief information on access to a plurality of depths when the user grabs the device controller. Thereafter, if the user moves the device controller in the z-axis direction while grabbing the device controller, the second device may change the depths. Such depth change may be performed on a basis of the content list, the menu list, the application list, or sub-lists thereof. For example, in the latter case, assuming that a total menu has a first depth, a first menu of the total menu may have a second depth according to the z-axis motion of the device controller and a sub-menu of the first menu, i.e., a second menu may have a third depth according to the z-axis motion of the device controller. Meanwhile, when there is no plurality of depths, zoom-in/out can be performed as described with reference to FIG. 17.

FIGS. 18a, 18b, and 18c show an application list with a first depth, an application list with a second depth, and an application list with a third depth, respectively.

FIGS. 16 to 18 define the x-axis and z-axis motions of the device controller. In addition, in case of a diagonal motion such as an x-z axis motion, depths and pages can be simultaneously changed as described above (not shown in the drawings). Further, the diagonal motion may indicate a different operation, which is not mentioned in the foregoing description.

Meanwhile, since various motions of the device controller according to the present invention can be implemented, it is difficult to define and explain all the motions of the device controller. Moreover, when the device controller according to the present invention senses an undefined motion, the device controller can consider the sensed undefined motion to indicate a new operation and then utilize it. However, the device controller can be configured to register an undefined motion only when detecting the undefined motion predetermined times or more.

FIG. 19 shows an embodiment of a method for controlling a guide screen 1910, which is provided by the second device, through the device controller.

Referring to FIG. 19, when the user grabs the device controller, a virtual plane may be displayed on the guide screen 1910 as shown in FIG. 19a. In this case, for example, the virtual plane may contain a predetermined image for explaining functions to control the guide screen 1910 provided by the second device.

If the user performs a motion in a y-axis direction while grabbing the device controller as shown in FIG. 19b, a scroll bar may be displayed on the guide screen 1910. Thereafter, if the user stops the motion in the y-axis direction while grabbing the device controller, a scroll operation may be continuously performed in the corresponding direction. In this case, if the user releases the grab of the device controller, the scroll operation may be terminated. Meanwhile, when the grab is released, a pointer for guiding motions of the device controller may be provided.

Although FIG. 19b shows an embodiment in which the guide screen is scrolled, FIG. 19c shows that when the user rotates the device controller in the x-y axis direction while grabbing the device controller, a previous page or a next page is displayed on the guide screen according to the corresponding rotation direction. Thereafter, when the user releases the grab of the device controller, a page change may be terminated.

According to the present invention, not only the grab strength but also a movement speed of the device controller while the device controller is grabbed can be used as factors for determining a control method, control maintenance/release, etc.

FIG. 20 is a diagram for explaining a video playback control method through the device controller.

Referring to FIG. 20a, a guide screen 2010 is provided and function explanation is provided through a virtual screen.

Referring to FIG. 20b, when the user moves the device controller in the x-axis direction only while grabbing the device controller, the user can control a video playback timeline 2020. In this case, the playback timeline may be changed according to grab strength applied to the device controller, or a movement speed or a movement distance in the corresponding direction after the grab of the device controller.

Meanwhile, referring to FIG. 20c, when the user moves the device controller in the y-axis (or z-axis) direction only while grabbing the device controller, the user can control volume of the video. In this case, the playback timeline may be changed according to grab strength applied to the device controller, or a movement speed or a movement distance in the corresponding direction after the grab of the device controller.

In addition, referring to FIG. 20d, when the user rotates the device controller in the x-y axis direction only while grabbing the device controller, a previous file 2044 or a next file 2042 may be played with reference to a current file 2040. In this case, if the video is a series, the previous file 2044 or the next file 2042 may be a previous episode or a next episode. If the vide is not a series, the playback of the video may be controlled according to the x-y axis motion such that same channels, different channels, preferred channels, related channels or related genres can be searched either automatically or manually.

Figure 21:
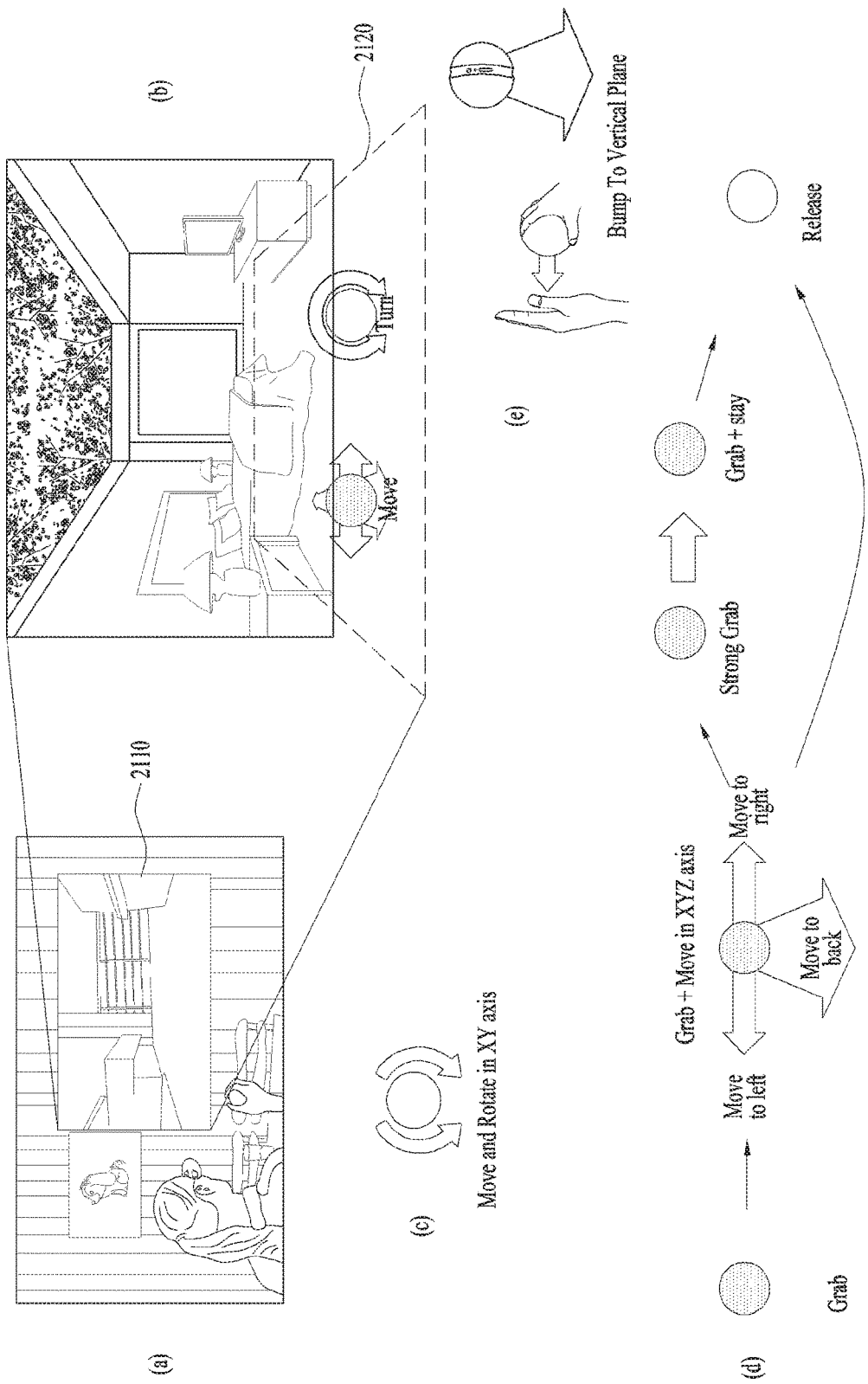
FIG. 21 is a diagram for explaining a method of remotely controlling another digital device through VR using the device controller according to an embodiment of the present invention.

FIG. 21 is a diagram for explaining a method of remotely controlling another digital device through VR using the device controller according to an embodiment of the present invention.

Referring to FIG. 21a, when the user wears a VR device such as an HMD, the HMD may receive data sensed by a sensor of an IoT device (e.g., Rolling Bot) and then configure and provide a related virtual screen 2110.

When the user moves the device controller in the situation shown in FIG. 21a, the Rolling Bot may recognize the device controller as its own controller by receiving a control signal and the HMD may provide a virtual screen 2120 as shown in FIG. 21b. In this case, the virtual screen 2120 may include a guide screen for the device controller to control operations of the Rolling Bot.

Referring to FIG. 21c, when the user rotates the device controller in the x-y axis direction, the Rolling Bot may rotate in place.

Referring to FIG. 21d, when the user moves the device controller in an x-y-z axis direction after grabbing the device controller, the Rolling Bot may move or change its movement direction. Thereafter, if the user changes the grab strength applied to the device controller, the Rolling Bot may change its movement speed or direction change speed. Meanwhile, if the user maintains the grab of the device controller without moving the device controller in any direction, the Rolling Bot may maintain the corresponding operation. If the user releases the grab of the device controller, the Rolling Bot may terminate the corresponding operation.

According to the present invention, if the user re-grabs the device controller within a predetermined time after releasing the grab of the device controller, the previous operation can be performed again. In other words, when the grab strength applied to the device controller is released, the device controller does not immediately transmit a control signal in accordance with the corresponding event. That is, the device controller waits for a predetermined time by considering a case in which the user temporarily releases the grab and then transmit the control signal after determining that the grab of the device controller does not occur for a while.

FIG. 21e shows a method of controlling the Rolling Bot based on a bump action.

Figure 22:
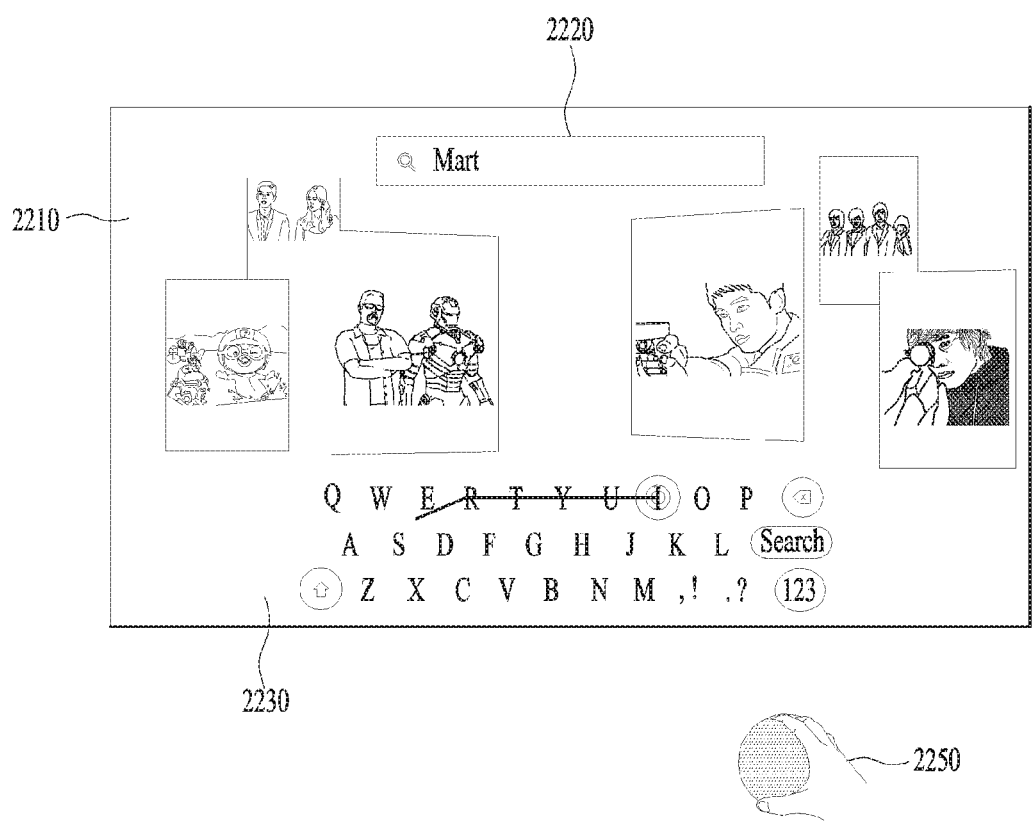
FIGS. 22 and 23 are diagrams for explaining a method of controlling a text input for a digital device using the device controller according to an embodiment of the present invention.
Figure 23:
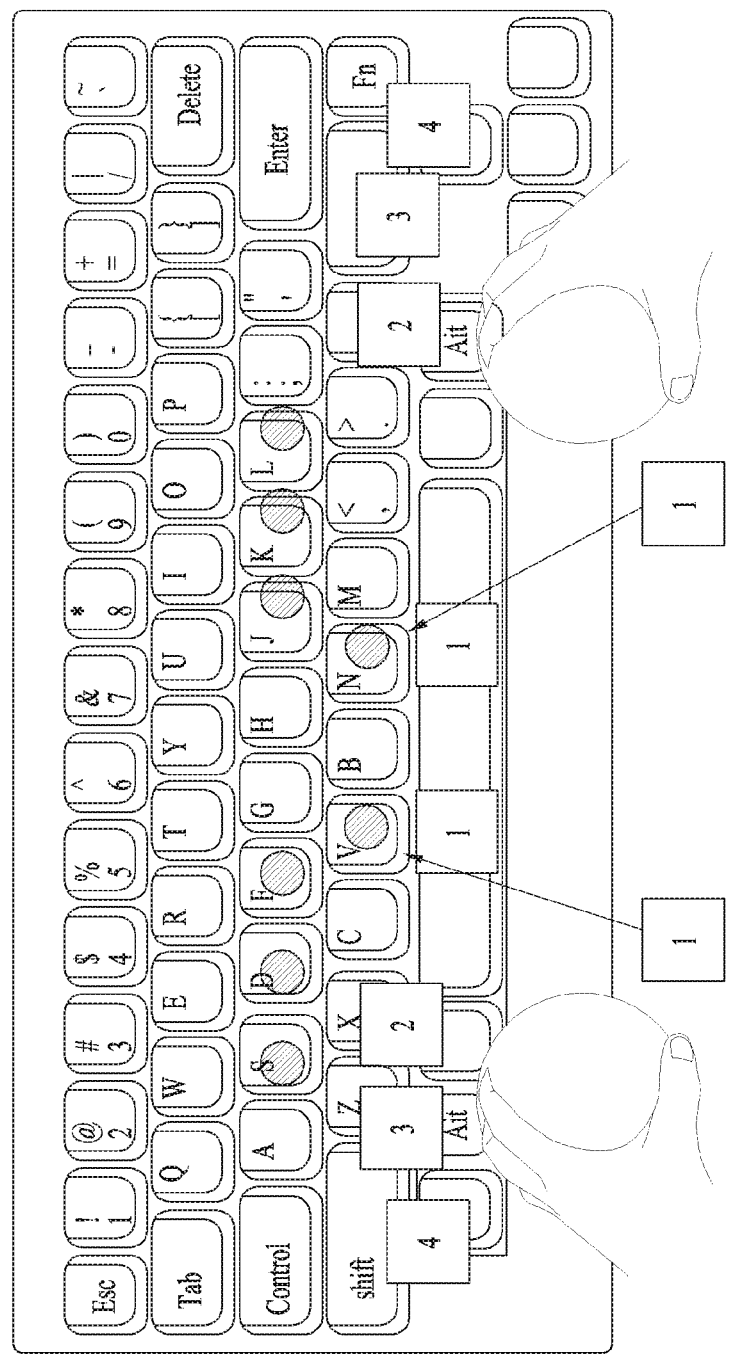

FIGS. 22 and 23 are diagrams for explaining a method of controlling a text input for a digital device using the device controller according to an embodiment of the present invention.

FIGS. 22 and 23 relates to the text input. For example, if the user grabs the device controller, a function of an application displayed on a screen of a display device or a function of an application currently executed in the display device may be automatically activated. For example, if the device controller detects that the user grabs the device controller while a search function is activated on the display screen of the display device or a virtual keyboard is provided on the display screen of the display device as shown in FIG. 22 or 23, a cursor for the text input may be provided automatically. This can be applied to other embodiments of the present invention in the same or similar manner. In other words, the device controller may automatically prepare to perform extra functions such as a pointer shape change depending on an attribute or state of the application, an attribute or state of the device, etc. If necessary, the device controller may download related data, firmware, or software from the corresponding device or a server and then install the downloaded data, firmware, or software.

Referring to FIG. 22, a search window 2220 and a virtual keyboard 2230 for inputting a search word to the search window are provided on a display screen 2210 of the display device. When the device controller is grabbed, the display device may perform operations related to the virtual keyboard 2230 based on a movement of the device controller.

If the user performs a motion while grabbing the device controller, the device controller may assist the user to easily input a search word through the virtual keyboard 2230 according to the motion. When the user releases the grab of the device controller, the virtual keyboard 2230 may be eliminated on the display screen 2210 of the display device.

Meanwhile, the display device may provide an application list on the display screen 2210 based on a search result. In this case, each application in the list may contain image data.

Referring to FIG. 23, the display device moves a cursor on the virtual keyboard according to the motion of the device controller. In this case, if a grab signal is received at a prescribed position of the virtual keyboard through the device controller, the display device may map one or more characters adjacent to a character located at the prescribed position and then provide virtual data. In other words, when the user grabs the device controller, the display device may map characters corresponding to user's fingers and then control the corresponding character to be selected or unselected according to the user's finger touch.

Figure 24:
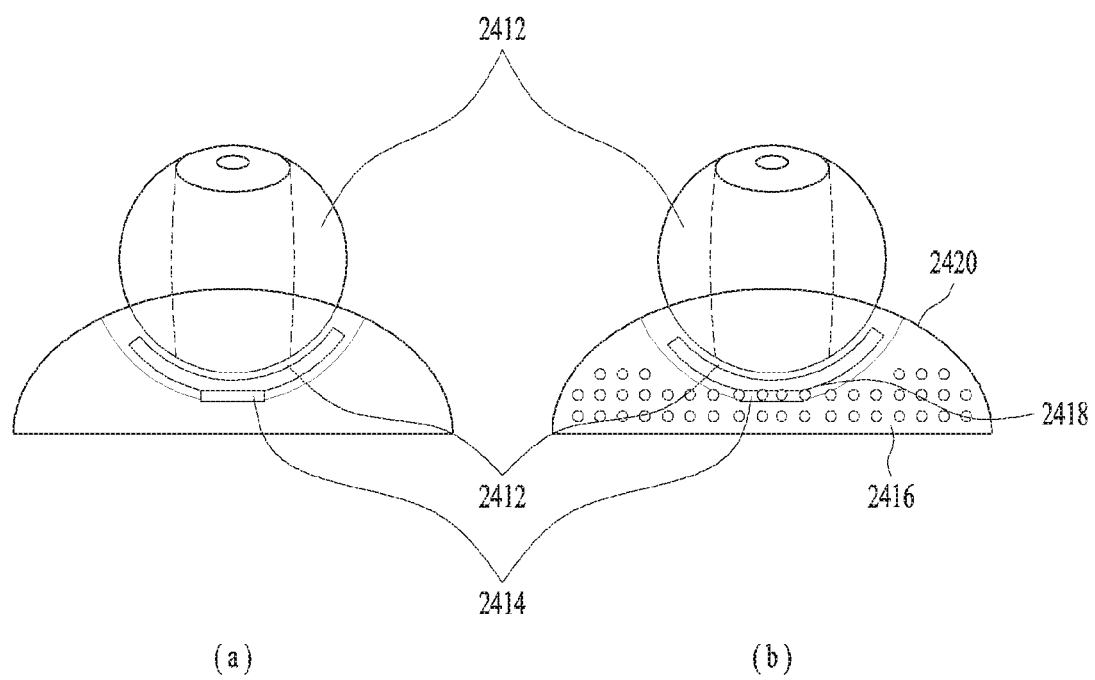
FIG. 24 is a diagram for explaining a method of controlling an Internet of things (IoT) device using the device controller according to an embodiment of the present invention.

FIG. 24 is a diagram for explaining a method of controlling an Internet of things (IoT) device using the device controller according to an embodiment of the present invention.

Specifically, FIG. 24 relates to a method of controlling an IoT device or a game device when the device controller is combined with the fixing part 810 shown in FIG. 8.

In this case, the fixing part 810 may be implemented in the form of FIG. 24a or 24b.

Referring to FIG. 24a, the fixing part 810 may support wireless charge through a wireless charger pad 2410 as well as wired charge through a charger cable. Meanwhile, if a lower part 2414 of the wireless charger pad 2410 has a tilted structure, it may freely move according to motions of the device controller connected to the charger pad of the fixing part. In addition, the device controller may radiate through an LED based on materials of a cover 2412 and radiated colors may be variously changed. For example, if the device controller is attached to the fixing part to charge the device controller, a color may be automatically determined according to a time at which the device controller is attached to the fixing part or changed depending on the charge amount of the device controller. Meanwhile, if the device controller may include a display window, the device controller may provide various data such as cover material, charge amount, current time, alarm information, and the like.

Referring to FIG. 24b, a speaker 2416, a tact key 2418, and a microphone 2420 may be further included to perform various functions.

Figure 25:
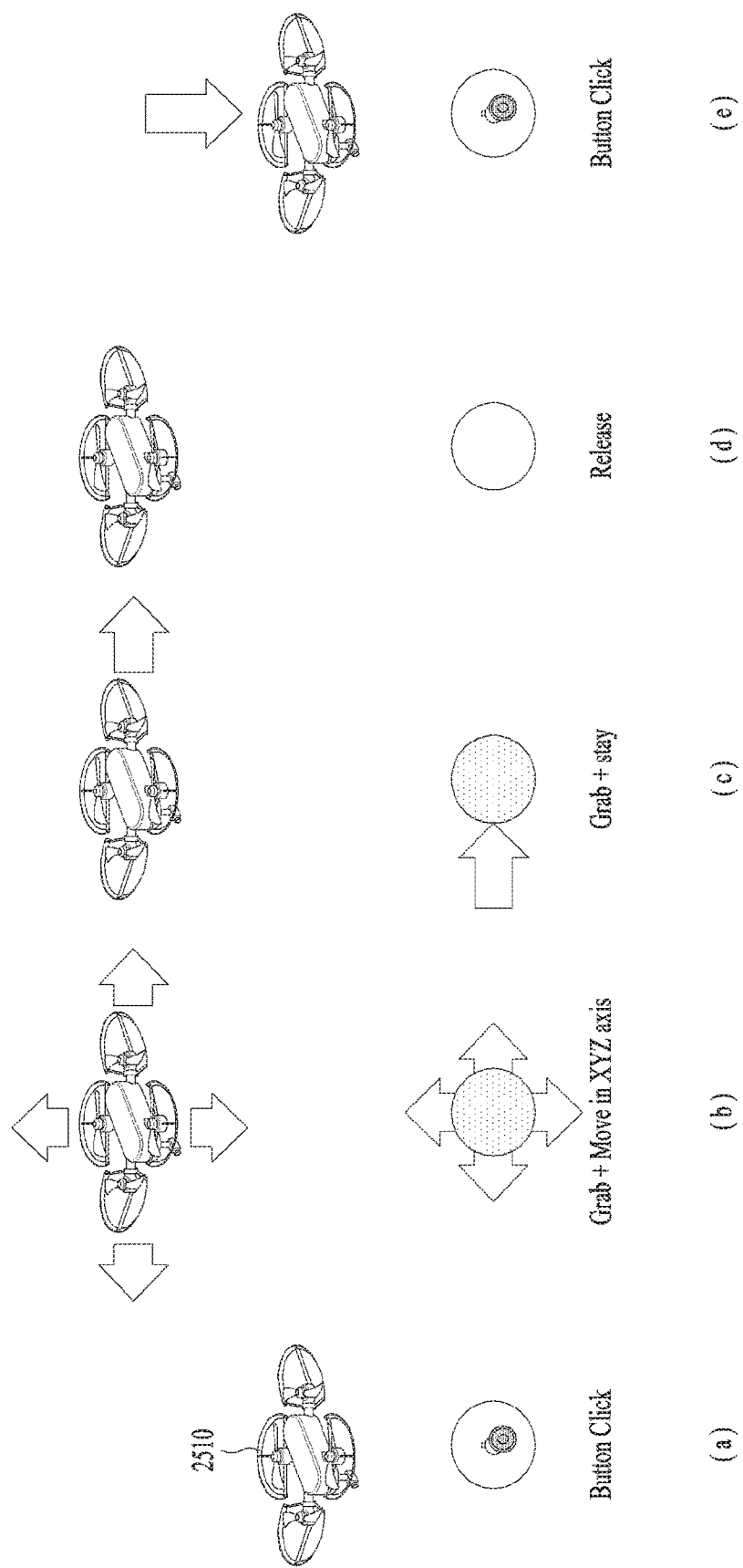
Figure 27:
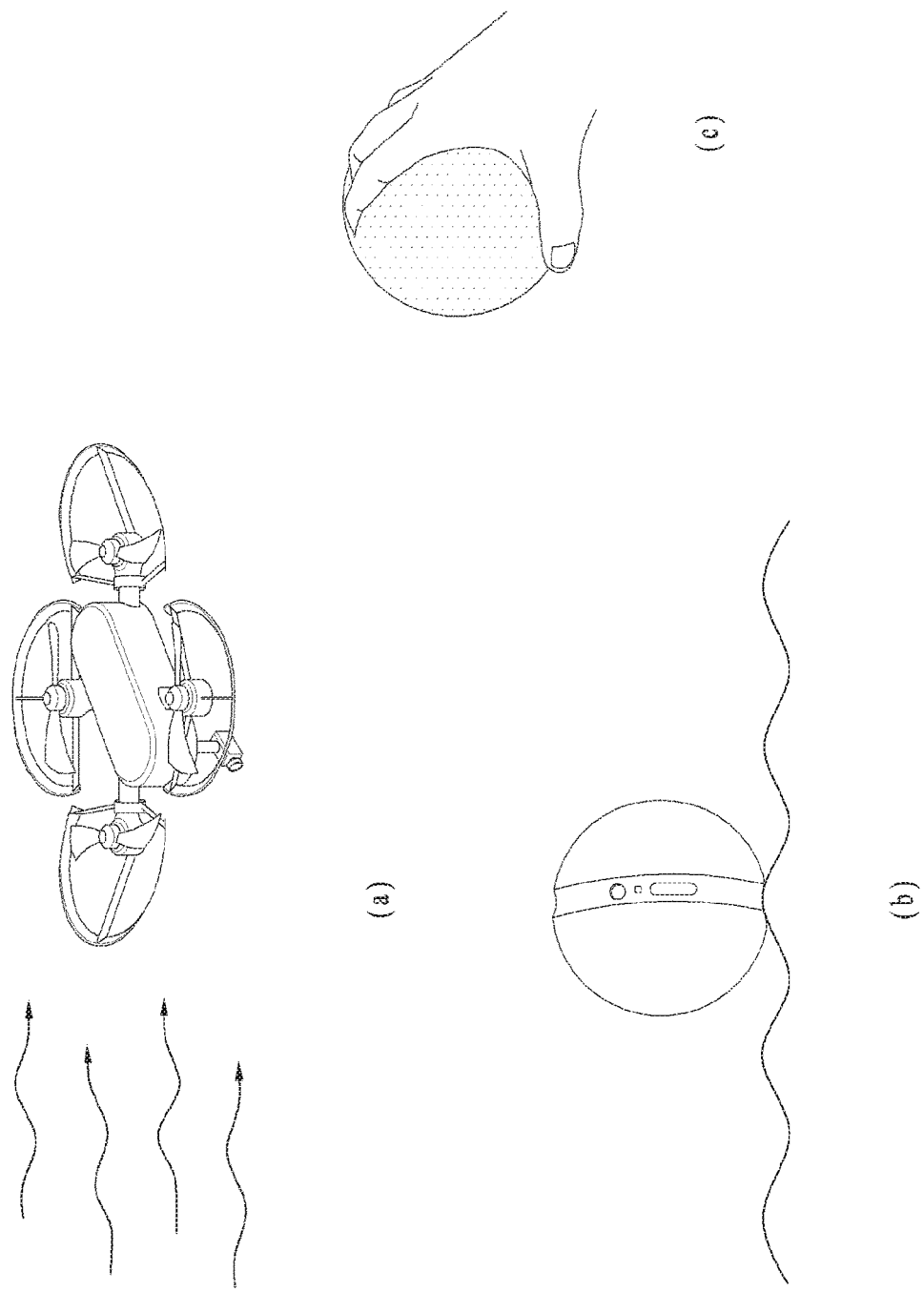

FIGS. 25 to 27 are diagrams for explaining a method of controlling a drone using the device controller according to an embodiment of the present invention FIGS. 25a to 25e sequentially shows taking off and landing of a drone 2510. As shown in FIG. 5, when the user clicks a button of the device controller, the drone 2510 is paired with device controller and then takes off. The pairing between the device controller and the drone 2510 may be performed in advance.

After the drone 2510 takes off, the user may control flight of the drone 2510 by grabbing the device controller. For example, as shown in FIG. 25b, when the user grabs and moves the device controller in the x-y-z axis direction after the drone 2510 takes off, the drone 2510 may move according to the user's control.

Referring to FIG. 25c, when the user maintains the movement of the device controller while grabbing the device controller, the drone 2510 may also maintain the operation in accordance with a control signal from the device controller. In other words, when the user maintains the device controller's movement in the x-axis direction, the drone 2510 may continuously moves in the x-axis direction instead of staying at the current position.

Referring to FIG. 25d, when the user releases the grab of the device controller, the drone 2510 may hover at the current position after stopping the movement in the x-axis direction unlike FIG. 25c.

Referring to FIG. 25e, when receiving a button click signal from the device controller, the drone may land in place or fly back and land at the start position. This may be determined based on a predetermined configuration.

Referring to FIG. 26, although the landing procedure of the drone is similar to that of FIG. 25e, the user may determine a landing position of the drone by grabbing and bumping the device controller after clicking the button.

For example, when the user bumps the device controller as shown in FIG. 26a, the drone flies back and land at the start position. However, when the user bumps the device controller as shown in FIG. 26b, the drone lands in place.

In this case, a landing speed and the like may be changed by various factors such as grab strength applied to the device controller when the user bumps the device controller, a bumping distance, a bumping speed, a voice input and the like.

The landing procedure mentioned with reference to FIG. 26 can be applied to the taking-off procedure of FIG. 25a in the same or similar manner.

FIG. 27 shows feedback provided when a digital device is controlled through the device controller. Particularly, FIG. 27 shows an embodiment for responding to an event such as change in the surrounding environment, interruption, or control signal transmission when the user remotely controls the digital device using the device controller.

When the user controls a drone through the device controller as shown in FIG. 27a, the drone operates according to a control signal from the device controller and provides feedback to the device controller by collecting sensing data such as information on wind strength and wind direction and other environment information. Thereafter, the device controller may output feedback such as vibration by parsing the sensing data fed back by the drone. For example, assume that the wind with first strength blows in a first direction. If a signal for controlling the drone to fly in a direction opposite to the first direction is transmitted through the device controller, the drone may provide feedback in order for the device controller to provide vibration feedback based on the sensed data. In this case, the vibration feedback may be determined based on wind direction, wind strength, or presence of resistance. Alternatively, it may be provided according to a predetermined configuration.

Referring to FIG. 27b, when the user transmits a control signal for moving the Rolling Bot in a first direction at a first speed through the device controller, the Rolling Bot provides feedback to the device controller by collecting sensing data such as a surface slope, a floor slope, or their states. Thereafter, the device controller outputs predetermined level of vibration based on the sensing data fed back by the Rolling Bot to allow the user to feel the vibration.

In FIGS. 27a and 27b, the device controller may define a plurality of vibration patterns according to a predetermined configuration and then output the vibration based on the sensing data fed back by the drone or the Rolling Bot using one of the defined vibration patterns.

Figure 28:
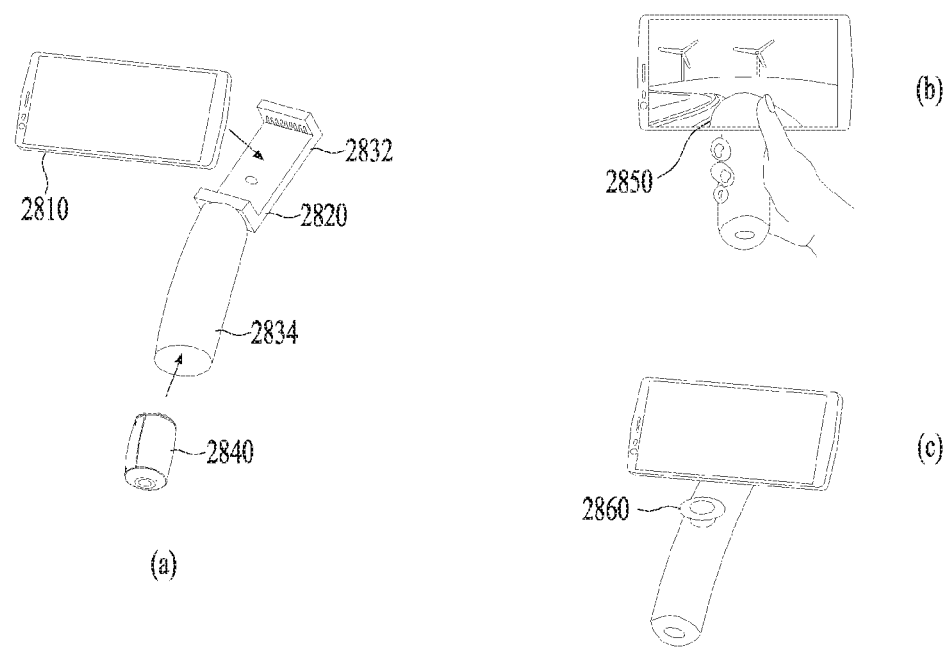
FIG. 28 is a diagram for explaining another embodiment of the device controller for drone control according to the present invention.

FIG. 28 is a diagram for explaining another embodiment of the device controller for drone control according to the present invention.

Specifically, FIG. 28 shows an example of combining a digital device capable of receiving data from a drone and displaying the received data (e.g., a mobile terminal such as a smart phone) and the device controller.

Referring to FIG. 28a, a drone controller is implemented such that a display device 2810 is mounted on a first module 2820 and a device controller 2840 is combined with a second module 2834. In this case, the device controller 2840 may include only the core body except the cover.

When the display device 2810 is mounted on the first module 2820, at least one of a drone control application, a camera application, an album application, and a video application may be executed.

FIG. 28b shows a drone control method using the drone controller configured as shown in FIG. 28a. In detail, when the display device 2810 is mounted on the first module 2820 and the device controller 2840 is combined with the second module 2830, the display device 2810 may display a soft key such as an icon for controlling the drone and an indicator on its screen. Thereafter, the user may control flight of the drone using a control command for the device controller, which is included in the drone controller, such as a grab, a motion, etc. and the soft key.

Unlike FIG. 28b where the soft key is used, FIG. 28c shows an embodiment of using hardware such as a jog key together with the device controller 2840 to control flight of the drone.

Figure 29:
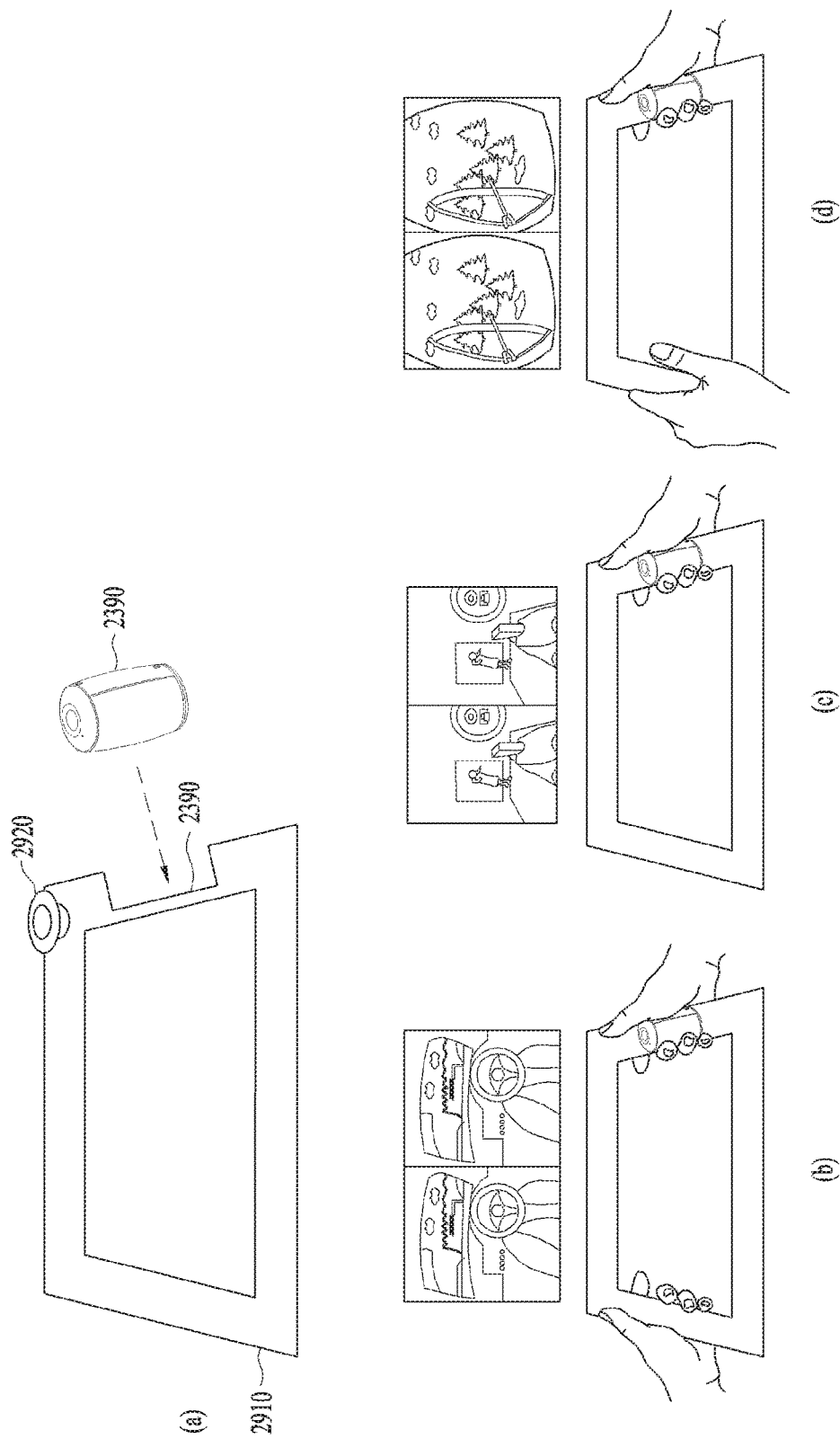
FIG. 29 is a diagram for explaining a further embodiment of the device controller for executing and controlling an application such as a game application according to the present invention.

FIG. 29 is a diagram for explaining a further embodiment of the device controller for executing and controlling an application such as a game application according to the present invention.

FIG. 29 relates to game control on a display device or a game device. In detail, if a device controller 2930 according to the present invention is attached at a predetermined position of a game motion controller 2910, a user may experience more precise and dynamic game control using resources of the game motion controller 2910 and device controller 2930.

Referring to FIG. 29a, the game motion controller 2910 may be made in a rectangle shape with empty space in the interior and a rectangle with a prescribed width in the exterior. In addition, the device controller 2940 may be attached to a prescribed part of the game motion controller 2910 and a jog key may be provided at each edge. In this case, the jog key can be placed at various locations and be detached. Moreover, the device controller 2940 can also be detached from the game motion controller 2910.

FIGS. 29b to 29d shows embodiments of game control through the game motion controller 2910 combined with the device controller 2940 and the jog key.

Therefore, according to the aforementioned embodiments of the present invention, it is possible to provide a device controller that can be commonly used for a plurality of digital devices. In addition, the device controller can not only provide improved user convenience but also allow a user to input in an intuitive manner by implementing the device controller in a user-convenient manner. Moreover, it is possible to improve the degree of design freedom of the device controller, whereby the device controller can be combined with other devices in various ways.

The device controller and data processing method thereof disclosed in the present specification are not limited to configurations and methods described above with reference to the embodiments. In addition, some or all of the embodiments are selectively combined for various modifications.

Meanwhile, the control method for the device controller according to the present invention may be implemented as code that can be written on a processor-readable recording medium and thus read by a processor provided in a network device. The processor-readable recording medium may include all kinds of recording media where data that can be read by the processor are stored. The processor-readable recording medium may include, for example, a read only memory (ROM), a random access memory (RAM), a CD-ROM, a magnetic tape, a floppy disk, and an optical data memory and it may be implemented in the form of a carrier wave transmitted over the Internet. In addition, the processor-readable recording medium may be distributed over a plurality of computer systems connected to a network such that processor-readable code is written thereto and executed therefrom in a decentralized manner.

Further, although the present invention is described with reference to the accompanying drawings, this is merely exemplary. Thus, the detailed description will not be limited to such exemplary embodiments and it should be understood that various modifications that can be made by anyone skilled in the art, to which the present invention relates, come within the scope of the appended claims and their equivalents. It is also apparent that such variations of this specification are not to be understood individually or separately from the technical scope or spirit of this specification.

What is claimed is:

1. A device controller for controlling a digital device, the device controller comprising:
   a cover;
   an upper core part including an input unit;
   a lower core part including an interface unit; and
   a core including a core body combined with the upper core part and the lower core part,
   wherein the core body comprises:
      a communication module configured to transmit and receive control signals for controlling the digital device;
      a first sensor module configured to sense motion data according to a movement of the device controller;
      a second sensor module configured to sense pressure applied to the core body;
      a first core body cover and a second core body cover configured to form outer surface of the core body;
      a motor included on at least one of the first and second core body covers; and
      a control unit configured to control operations of the first and second sensor modules, collect data sensed by the first and second sensor modules, generate a control signal based on the collected sensed data, and output feedback,
   wherein the control unit is configured to control the motor and thereby control a distance between the first core body cover and the second core body cover to configure the core body, and
   when the control unit initiates adjustment of a size of the device controller, the control unit controls the motor to change the distance between the first core body cover and the second core body cover until a sensed pressure value, from a user's hand, is detected to be within a predetermined pressure value range.

2. The device controller of claim 1, wherein the core body further comprises at least one of an actuator, a tact key, and a pressure sensor.

3. The device controller of claim 1, wherein the first sensor module is implemented as one of a three-axis sensor, a six-axis sensor, and a nine-axis sensor based on at least one of an acceleration sensor, a gyro sensor, and a terrestrial magnetic sensor.

4. The device controller of claim 1, wherein the second sensor module is made of at least one of elastic materials selected from a group consisting of a spring, a magnetic spring, a conductive string, and an electronic textile.

5. The device controller of claim 1, wherein the interface unit of the lower core part is implemented as at least one of a USB, a micro USB, a POGO pin, and a connector to provide an interfacing environment by being combined with an external accessory and perform a charge function for the device controller.

6. The device controller of claim 1, wherein the control unit is configured to control a distance between the first core body cover and the second core body cover to configure the core body by controlling the motor according to a mode of the device controller.

7. The device controller of claim 1, wherein when a key input signal is received through the input unit of the upper core part and/or when the motion data is sensed and collected by the first or second sensor module, the control unit is configured to configure a communication packet based on the collected sensed data and transmit the configured communication packet to the digital device and wherein the configured communication packet includes a control command for controlling an operation of the digital device.

8. The device controller of claim 1, wherein the control unit is configured to sense grab strength applied to the core body through the first or second sensor module and wherein the control unit is configured to generate a control command by determining at least one of turn-on/off, operation start/end, and item selection/execution of the digital device based on the sensed grab strength.

9. The device controller of claim 1, wherein the cover is made of an elastic material to sense grab strength applied to the core body and wherein the device controller is configured to receive control signals from all directions regardless of inclinations of the core body with reference to the ground.

* * * * *